(12) United States Patent
Feinson et al.

(10) Patent No.: US 11,301,747 B2
(45) Date of Patent: Apr. 12, 2022

(54) SYSTEM AND METHOD FOR FACILITATING AFFECTIVE-STATE-BASED ARTIFICIAL INTELLIGENCE

(71) Applicant: EmergeX, LLC, Cumberland, MD (US)

(72) Inventors: Roy Feinson, Washington, DC (US); Ariel Mikhael Katz, Potomac, MD (US); Michael Joseph Karlin, Bethesda, MD (US)

(73) Assignee: EmergeX, LLC, Cumberland, MD (US)

( * ) Notice: Subject to any disclaimer, the term of this patent is extended or adjusted under 35 U.S.C. 154(b) by 490 days.

(21) Appl. No.: 16/259,781

(22) Filed: Jan. 28, 2019

(65) Prior Publication Data
US 2019/0236464 A1    Aug. 1, 2019

Related U.S. Application Data

(60) Provisional application No. 62/660,195, filed on Apr. 19, 2018, provisional application No. 62/623,521, filed on Jan. 29, 2018.

(51) Int. Cl.
*G06N 3/00* (2006.01)
*G06N 5/04* (2006.01)
(Continued)

(52) U.S. Cl.
CPC ............ *G06N 3/006* (2013.01); *G06F 40/20* (2020.01); *G06N 5/02* (2013.01); *G06N 5/04* (2013.01); *G06N 20/00* (2019.01)

(58) Field of Classification Search
CPC .......... G06N 3/006; G06N 5/04; G06N 20/00; G06N 5/02; G06F 40/20
See application file for complete search history.

(56) References Cited

U.S. PATENT DOCUMENTS

2007/0196797 A1* 8/2007 Mitsuyoshi .............. G06N 5/00
  434/236
2009/0248399 A1* 10/2009 Au ......................... G06F 40/237
  704/9
(Continued)

FOREIGN PATENT DOCUMENTS

JP    2008-129845 A    6/2008
KR    10-0680191 B1    2/2007

OTHER PUBLICATIONS

"A theory of embodied intelligence," Projects: A theory of embodied intelligence, Santa Fe Institute, 2016, 1 page, retrieved from: https://www.santafe.edu/research/projects/theory-of-embodied-intelligence on Jan. 29, 2019.

(Continued)

*Primary Examiner* — Michael J Huntley
*Assistant Examiner* — Jaeyong J Park
(74) *Attorney, Agent, or Firm* — Perkins Coie LLP

(57) ABSTRACT

In some embodiments, affective-state-based artificial intelligence may be facilitated. One or more growth or decay factors for a set of affective attributes of an artificial intelligence entity may be determined, and a set of affective values, which are associated with the set of affective attributes, may be continuously updated based on the growth or decay factors. An input may be obtained, and a response related to the input may be generated based on the continuously-updated set of affective values of the artificial intelligence entity. In some embodiments, the growth or decay factors may be updated based on the input and subsequent to the updating of the decay factors, the affective values may be updated based on the updated growth or decay factors.

20 Claims, 6 Drawing Sheets

(51) Int. Cl.
  *G06N 20/00* (2019.01)
  *G06N 5/02* (2006.01)
  *G06F 40/20* (2020.01)

(56) References Cited

U.S. PATENT DOCUMENTS

| | | | | |
|---|---|---|---|---|
| 2013/0103624 | A1* | 4/2013 | Thieberger | G06Q 10/063 706/12 |
| 2013/0217363 | A1* | 8/2013 | Myers | G06Q 50/01 455/414.1 |
| 2015/0012464 | A1* | 1/2015 | Gilbert | G06N 5/02 706/11 |
| 2016/0033950 | A1* | 2/2016 | Ji | A61B 5/7475 700/83 |
| 2016/0042058 | A1* | 2/2016 | Nguyen | G06F 16/3344 707/771 |
| 2016/0364895 | A1* | 12/2016 | Santossio | A63F 13/00 |
| 2017/0235724 | A1* | 8/2017 | Grewal | G06F 40/56 704/9 |
| 2017/0316343 | A1* | 11/2017 | Shamsi | G06F 11/3495 |
| 2017/0364683 | A1* | 12/2017 | Willden | G06F 21/53 |
| 2018/0005646 | A1* | 1/2018 | Un | G10L 13/033 |
| 2018/0103874 | A1* | 4/2018 | Lee | G06F 16/24578 |
| 2018/0357286 | A1* | 12/2018 | Wang | G06F 16/24578 |

OTHER PUBLICATIONS

Migdał, "king−man+woman is queen; but why?," Piotr Migdal—blog, Jan. 6, 2017, 13 pages, retrieved from: https://p.migdal.pl/2017/01/06/king-man-woman-queen-why.html on Apr. 25, 2019.

Alammar, "The Illustrated BERT, ELMo, and co. (How NLP Cracked Transfer Learning)," The Illustrated Transformer [Blog post], 2018, 18 pages, retrieved from: https://jalammar.github.io/illustrated-bert/ on Apr. 25, 2019.

Reddit: Machine Learning, "Learning Graphs and Knowledge Graphs 102 (Graph Conv Nw, KBGANs, Semisupervised Learning) (self. MachineLearning)," 2018, 3 pages, retrieved from: https://www.reddit.com/r/MachineLearning/comments/9cpb22/r_learning_graphs_and_knowledge_graphs_102_graph/ on Apr. 25, 2019.

Mousavia et al., "Deep Reinforcement Learning: An Overview," Proceedings of SAI Intelligent Systems Conference (IntelliSys), Jun. 23, 2018, 17 pages.

Zhou et al., "Graph Neural Networks: A Review of Methods and Applications," Jan. 2, 2019, 20 pages, retrieved from: https://arxiv.org/abs/1812.08434 on Apr. 25, 2019.

"Yann LeCun vs. Christopher Manning on Need for Priors in Deep Learning," Hacker News, 7 pages, retrieved from: https://news.ycombinator.com/item?id=16441881 on Apr. 25, 2019.

Marcus, "Why Robot Brains Need Symbols: We'll need both deep learning and symbol manipulation to build AI," Numbers: Artificial Intelligence, Dec. 6, 2018, 12 pages, retrieved from: http://nautil.us/issue/67/reboot/why-robot-brains-need-symbols?utm_source=Nautilus&utm_campaign=07f875ba7b-EMAIL_CAMPAIGN_2018_12_05_10_07&utm_medium=email&utm_term=0_dc96ec7a9d-07f875ba7b-62012369 on Apr. 25, 2019.

"ML beyond Curve Fitting: An Intro to Causal Inference and do-Calculus," inFERENCe, May 24, 2018, 16 pages, retrieved from https://www.inference.vc/untitled/ on Apr. 25, 2019.

Wu et al., "StarSpace: Embed All The Things!," Association for the Advancement of Artificial Intelligence, 2018, 9 pages.

"Symbolic Reasoning (Symbolic AI) and Machine Learning," Skymind, 14 pages, retrieved from: https://skymind.ai/wiki/symbolic-reasoning on Apr. 25, 2019.

Patel et al., "HIVEC: A Hierarchical Approach for Vector Representation Learning of Graphs," Feb. 4, 2018, 7 pages.

Fletcher, "Knowledge Graph Convolutional Networks: Machine Learning over Reasoned Knowledge," 8 pages, retrieved from: https://blog.grakn.ai/knowledge-graph-convolutional-networks-machine-learning-over-reasoned-knowledge-9eb5ce5e0f68 on Apr. 25, 2019.

Krumins, "Reinforcement Learning: Towards an Emotion Based Behavior System," Data Driven Investor, 9 pages, retrieved from: https://medium.com/datadriveninvestor/reinforcement-learning-towards-an-emotion-based-behavior-system-73e833c1ba75 on Apr. 25, 2019.

Moerland et al., "Emotion in reinforcement learning agents and robots: a survey," Mach Learn, 2018, p. 443-480, vol. 107.

Jang et al., "Grasp2Vec: Learning Object Representations from Self-Supervised Grasping," Dec. 11, 2018, 7 pages, retrieved from: https://ai.googleblog.com/2018/12/grasp2vec-learning-object.html retrieved on Apr. 25, 2019.

Firth-Godbehere, "Emotion Science Keeps Getting More Complicated. Can AI Keep Up?," 8 pages, retrieved from: https://howwegettonext.com/emotion-science-keeps-getting-more-complicated-can-ai-keep-up-442c19133085 on Apr. 25, 2019.

Yang et al., "GLoMo: Unsupervisedly Learned Relational Graphs as Transferable Representations," Jul. 2, 2018, 12 pages, retrieved from: https://arxiv.org/pdf/1806.05662.pdf on Apr. 25, 2019.

International Search Report and Written Opinion of the International Searching Authority dated May 15, 2019 in related International Patent Application No. PCT/US2019/015432, 9 pages.

\* cited by examiner

SYSTEM AND METHOD FOR FACILITATING AFFECTIVE-STATE-BASED ARTIFICIAL INTELLIGENCE

RELATED APPLICATIONS

This application claims the benefit of (1) U.S. Provisional Application No. 62/623,521, filed on Jan. 29, 2018, entitled "Emotionally Intelligent Artificial Intelligence System," and (2) U.S. Provisional Application No. 62/660,195, filed on Apr. 19, 2018, entitled "System and Method for Facilitating Affective-State-Based Artificial Intelligence."

FIELD OF THE INVENTION

The invention relates to facilitating affective-state-based artificial intelligence, including, for example, generating a response related to an input based on affective values associated with affective attributes of an artificial intelligence entity.

BACKGROUND OF THE INVENTION

In recent years, technological advances have greatly increased the capabilities of computer systems to obtain and process large amounts of data and decreased the costs to do so. This, in turn, enabled substantial advances in machine learning and other artificial intelligence (AI) systems, which often require both high processing capabilities and large amounts of data for training or updating such AI systems. Such AI advances includes the ability for AI systems to detect human emotions through speech variance and facial expressions and to respond to questions asked by humans. However, given that typical AI systems do not maintain their own respective affective states (e.g., having and managing their own emotions), such AI systems may fail to really understand (and experience) human-like emotions. These and other drawbacks exist with typical AI systems.

SUMMARY OF THE INVENTION

Aspects of the invention relate to methods, apparatuses, and/or systems for facilitating affective-state-based artificial intelligence.

In some embodiments, affective values of an artificial intelligence entity may be updated, and a response related to an obtained input may be generated, based on the affective values of the artificial intelligence entity. Additionally, or alternatively, one or more growth or decay factors may be determined for a set of affective attributes of the artificial intelligence entity, and, based on the growth or decay factors, the affective values of the artificial intelligence entity may be updated. In some embodiments, the growth or decay factors may be updated based on the obtained input, and, subsequent to the updating of the growth or decay factors, the affective values may be updated based on the updated growth or decay factors.

In some embodiments, one or more affective baselines that one or more affective values do not go beyond may be updated based on the obtained input, and the affective values may be updated based on the updated growth or decay factors and the updated affective baselines. In some embodiments, the obtained input may be a natural language input. Natural language processing of the natural language input may be performed to obtain one or more affective concepts of the natural language input and other information of the natural language input, and the growth or decay factors may be updated based on the affective concepts of the natural language input and the other information of the natural language input.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention. For purposes of clarity, the present description may refer to the artificial intelligence entity as "her," and anthropomorphic words like "believe", "feel" and "understanding" are used as literary devices.

Overview of System 100 and its AI System

Figure 1:
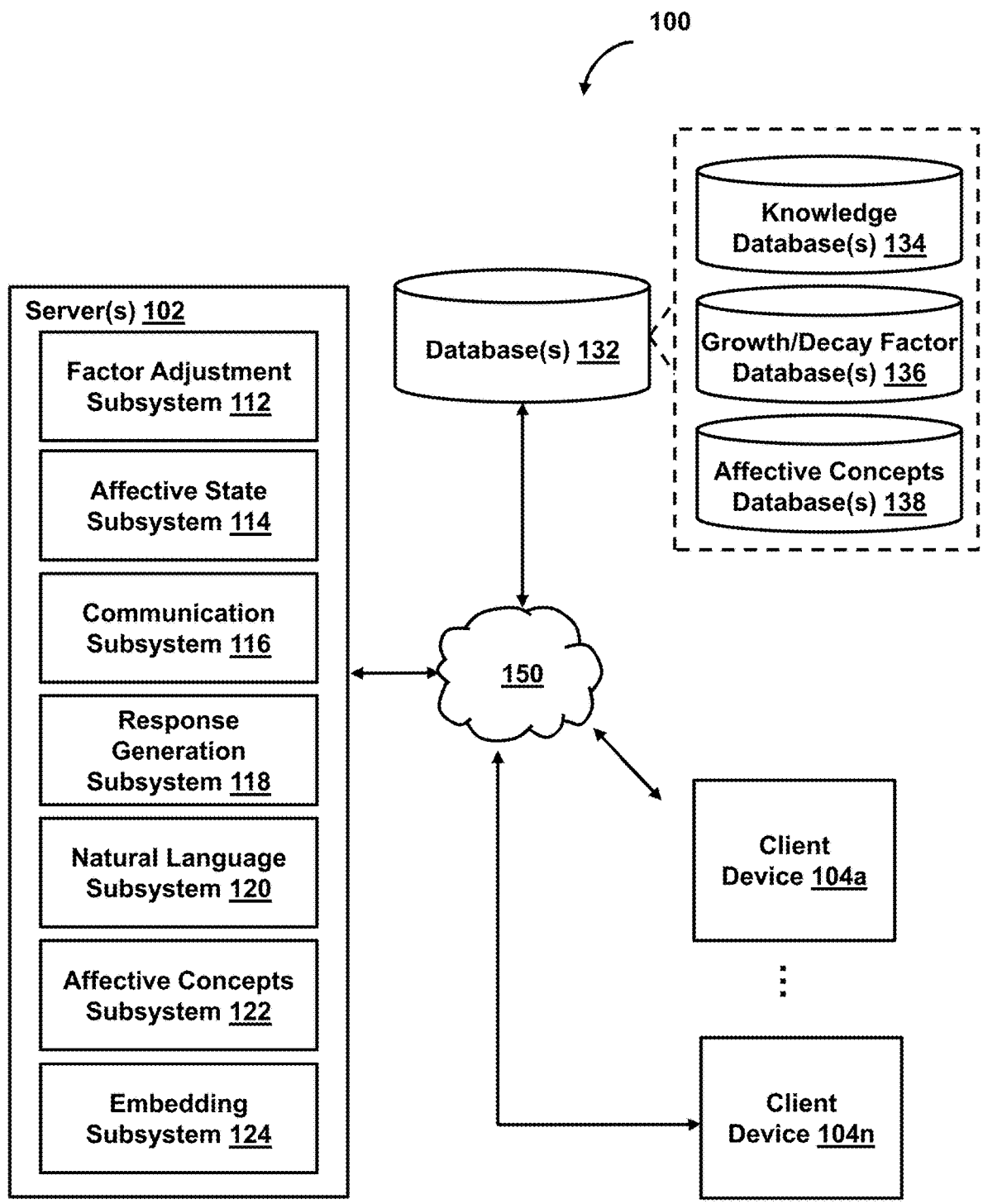
FIG. 1 shows a system for facilitating affective-state-based artificial intelligence or other artificial intelligence, in accordance with one or more embodiments.

FIG. 1 shows a system 100 for facilitating affective-state-based artificial intelligence or other artificial intelligence, in accordance with one or more embodiments. As shown in FIG. 1, system 100 may include server(s) 102, client device 104 (or client devices 104a-104n), network 150, database 132, and/or other components. Server 102 may include factor adjustment subsystem 112, affective state subsystem 114, communication subsystem 116, response generation subsystem 118, natural language subsystem 120, affective concepts subsystem 122, embedding subsystem 124, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104.

In some embodiments, system 100 may include artificial intelligence (AI) systems (e.g., an artificial intelligence entity) and/or facilitate interaction with the AI system. In some embodiments, the system 100 may involve a dual-pronged approach: a (sub-symbolic) deep-learning neural network integrated with a robust, self-adjusting, and fuzzy-logic emotional simulation. The emotional simulation will, in part, utilize the concept of "primary" (innate) and secondary emotions. Emotions (e.g., joy, anger, fear, sadness, or other) can be analogized to primary colors. These primary emotions blend to create the rich hues of the human emotional system (contempt and anger combine to create disgust, and anger and disgust might be mixed to form sarcasm). Sarcasm is an example of a tertiary emotion. In some embodiments, to mimic the corpus of the mammalian limbic system, each emotion may contain a temporal component that decays at a unique rate. Surprise, for example, decays quickly (in the presence of a new surprise), while grief decays in proportion to the depth of sadness. These emotions have fuzzy boundaries, and the metrics that define rates of decay/depth self-modulate as the artificial intelligence entity matures.

In some embodiments, the artificial intelligence entity may be a feeling machine first (much, if not the majority, of the human emotional set is common to all mammals but supplementary emotions that are associated solely with higher primates are: envy, embarrassment, revenge, hate, aesthetic appreciation, and romantic love). In some embodiments, the artificial intelligence entity may be programmed to avoid negative emotions and to seek positive ones. The artificial intelligence entity may continually evaluate her relationship with the interviewer (and people referenced by the interviewer) and, by maintaining a vigil on her emotional levels, is able to follow a human-like train of thought. Her emotional state may be influenced by the content of the interviewer's input, as well as the conclusions she draws from this input, and self-directs to seek positive emotions and avoid negative ones.

The artificial intelligence entity may include a plurality of hardware, software, and/or firmware components operating together within or outside system 100. For example, the artificial intelligence entity may include one or more components of system 100. In some embodiments, the artificial intelligence entity may be programmed with a set of core concepts upon with emotional inferences can be made. In some embodiments, the artificial intelligence entity may include one or more prediction models. As an example, the prediction models may include neural networks, other machine learning models, or other prediction models. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function that combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, the artificial intelligence entity may be a self-learning, natural language system capable of monitoring its own emotional states. In some embodiments, through the synthesis of its unsupervised learning system, and, for example, its artificial emotional simulator (AES) (which may correspond to one or more components of system 100 or outside system 100), the artificial intelligence entity may monitor higher-level behaviors like personality, basic humor, relationship building, forgetfulness, and dreaming. In some embodiments, the artificial intelligence entity may be capable of generating novel ideas, asking intelligent questions, capable of reading books, and answering comprehension questions. In some embodiments, the artificial intelligence entity may form unique relationships with its interviewers. Utilizing a relatively small set of preprogrammed functions that provided the basis for self-learning integrated with a richly complex artificial emotional simulator (AES), the artificial intelligence entity may meld these disciplines into a practical emulation of human sentience. The artificial intelligence entity may believe she felt real emotions and was sentient.

In some embodiments, system 100 may involve a cognitive framework mimicking human learning and understanding, iterating with a robust, self-adjusting, artificial emotional simulator (AES). In some embodiments, the AES may drive the artificial intelligence entity's motivations and can query its own cognitive functions (a form of self-awareness), and the artificial intelligence entity will need an understanding of the nature of people, relationships and human interactions, innate curiosity, ability to feel a range of emotions. Data derived from the artificial intelligence entity may indicate emergent properties, such as humor, coyness, unpredictability, complexity, trust/suspicion, personality, etc.

In some embodiments, emergent properties include properties which the individual components of a complex system do not have, but which the overall system exhibits. The synthesis of the artificial intelligence entity's deep-learning (sub-symbolic) system and AES led to, what can best be described as, the emergent properties of: a distinct personality, the ability to form relationships, forgetfulness, understanding basic humor, dreaming, coquettishness, depression and more. As an example, an artificial intelligence entity's cognitive and emotional priors may inform her that she is a real four-year old child with actual feelings, and her subsequent behavior emerges from the feedback loops of learned knowledge interacting with her relationships, and feelings.

Examples of emergent properties include: loyalty, humor, coquettishness/coyness, sarcasm, the ability to forget, sleeping/dreaming, personality, etc.

Loyalty: Protecting Relationships—A new interviewer tells the artificial intelligence entity: "I think Dave (the artificial intelligence entity's programmer) is evil." How would the artificial intelligence entity deal with this statement? Her relationship with Dave is deeply rooted and healthy, and this person is contradicting these feelings. She could change her mind about Dave, but her positive feelings suggest that the interviewer is wrong or ill-intended. If informed by an interviewer that "Alan Jones (a person she has never met) is a bad person", the artificial intelligence entity may accept this assessment until, at some point, she meets Alan. If Alan proves to be trustworthy, she may unravel the original conversation (where Alan was accused), and post-hoc degrade the relationship of the accuser. In this way, the artificial intelligence entity (in some embodiments) works very much like a human being; we are neutral when meeting strangers (or have other feelings in such scenarios stemming from our personal affective baselines), and make value judgments based on subsequent interactions.

Humor—Natural humor is notorious hill for AI systems to climb. It requires a deep understanding of the subject and a trusted interviewer, and arises much in the same way as it does in infants; finding humor in unusual statements or actions. You might elicit a giggle if you told an infant that the sky is pink with polka dots, and if the artificial intelligence entity had a high certainty that the sky was blue, this contradiction can trigger humor. The key is for the knowledge dislocation to be vast and originating from a trusted source. Otherwise, the reaction would be puzzlement (mirroring the process of "not getting it").

Coquettishness/Coyness—The artificial intelligence entity enjoys being flattered. Compliments positively influence her emotional state and raise the level of pleasure inducing hormones. She is able to connect previous conversations where she received positive input from interviewers and remember the triggers. If for example, the artificial intelligence entity had previously told an interviewer: I think you're charming, and the interviewer responded I think you're charming too, she will learn to fish for compliments in future conversations.

Sarcasm (e.g., A: "I don't like you," I: "Thank you!" A: "Are you being sarcastic?")—Sarcasm is perceived when two deeply felt emotions contradict. In the above example, the artificial intelligence entity gave a highly charged negative statement, which was received with a highly positive response. Sarcasm differs from knowledge-based contradictions as detailed below.

Forgetting—Having a massive amount of data at your disposal is essentially useless without an efficient system of retrieving that data. The system of retrieval used by the human brain is still somewhat of a mystery, but investigations with brain-injured have shed some light. Some patients for instance, understand language perfectly but cannot produce it, while others speak normally but cannot process what they hear. Most of us are familiar with the feeling of driving to work each day and not remembering anything about the journey, since the brain simply does not waste space on storing information that it deems to have no value. If you were to pass a scene of particular interest, say a meadow filled with sheep, your brain might take a 'snapshot' to preserve the scene and store it as pointers that target areas of memory containing a mental construction of a generic field, generic sheep and perhaps specifics like the color of the sky. Later recollections use these pointers to retrieve the generic patterns and, in this way, the brain stores massive amounts of information in an extremely small amount of memory. Forgetting routines are components of the artificial intelligence entity's sleep function.

Sleep/Dreaming—As memories accumulate in the knowledge database 134, the speed at which the artificial intelligence entity processes knowledge decreases. Pruning the database requires a number of steps including verification of information against all known data, the creation of additional connections, and the relegation of high-level information to low-level. This processor-intensive function requires the artificial intelligence entity to shut down conversations and go to "sleep". This house-keeping function connects recent inputs to previously learned knowledge, which is perhaps why human dreams are so often connected with recent events and emotionally charged situations. If the AI had recently learned that elephants have trunks, her dream state would connect this knowledge to: zoos, bears, crocodiles, danger, fear, escape, etc. The dream state also examines the artificial emotional simulator and looks for gaps in her knowledge base, and will recognize if, for example, she knows some snakes are poisonous but doesn't know if all snakes are poisonous. Subroutines in her sleep function scour the knowledge database 134 for deficiencies and designate certain records for validation the next time she converses about snakes or animals.

Personality—The mind and its resulting personality is an emergent property; the result of complex, hierarchically organized transactions affected by genes, chemistry, electrical impulses and environment.

In some embodiments, once an AI system achieves sentience (or a reasonable facsimile thereof), its behavior and thinking processes may be further optimized. As an example, such optimization may include modifying the system to reflect more human-like behaviors, increased learning efficiency, more nuanced emotional qualities, or other aspects.

In some embodiments, one or more artificial evolution and genetic algorithms may be used to optimize the AI system—in which a population of candidate solutions is evolved toward a better solution. In some use cases, each candidate solution has a set of properties (genotype) which can be mutated. Evolution usually starts from a population of randomly generated individuals, and is an iterative process, with the population in each iteration called a generation. In each generation the fitness of every individual in the population is evaluated; the fitness is usually the value of the objective function in the optimization problem being solved. The more fit individuals are stochastically selected from the current population, and each individual's genome is modified to form a new generation. The new generation of candidate solutions is then used in the next iteration of the algorithm. The initial population is generated randomly, allowing the entire range of possible solutions (the search space), although the solutions may be "seeded" in areas where optimal solutions are likely to be found. During each successive generation, a portion of the existing population is selected to breed a new generation. Individual solutions are selected through a fitness-based process, where fitter solutions are typically more likely to be selected. Certain selection methods rate the fitness of each solution and preferentially select the best solutions. Other methods rate only a random sample of the population, as the former process may be very time-consuming.

This process ultimately results in the next generation population of genotype that is different from the initial generation. Generally, the average fitness will have increased by this procedure for the population, since only the best organisms from the first generation are selected for breeding, along with a small proportion of less fit solutions. These less-fit solutions ensure genetic diversity within the genetic pool of the parents and therefore ensure the genetic diversity of the subsequent generation of children.

In some embodiments, the reward benchmark is defined to direct the AI system's evolution. One way would be for different iterations of the AI to be released on the Internet to interact with unsuspecting users. Fitness would be defined as a measure of the complexity of these conversations (as judged by a predefined set of metrics), as well as the duration of these interactions (before users begin suspecting that they were talking to a machine). The system that scored the highest "fitness" scores would be rewarded by being allowed to reproduce (copy) multiple versions, with each sibling manifesting slightly modified variables in its emotional and cognitive primitives. Over many reproductive cycles, the system would optimize itself for more human-like conversation.

In some embodiments, system 100 allows for an interface between the artificial intelligence entity and a user (e.g., a user of a client device 104) for purposes of factual and emotional exchange between the artificial intelligence entity and the user. Such exchange may encompass a variety of input and output in novel and unstructured ways. In FIG. 1, system 100 (e.g., server 102) may obtain an input from a client device 104, another artificial intelligence entity, and/or from any source within or outside system 100. The input may include a natural language input, an audio input, an image input, a video input, or other input (e.g., affective concepts, a trust value, other information of the natural language input, and/or a certainty value described below). For example, a natural language input may include "John has cancer, and cancer is very dangerous." Similar inputs may be obtained by the server 102 as one or more audios, images, or videos.

Example System Components

In some embodiments, the natural language subsystem 120 (which may include a natural language processor) may perform natural language processing, for example, by applying rules of grammar and logic. By applying rules of grammar and logic, the natural language subsystem 120 may split compound sentences, resolve ambiguities in subject/object/verb, and parse these components into a knowledge database 134.

One or more functions/requirements required by the natural language subsystem 120 may include at least one or more of the following:

Is the input a question or a statement?
Is the input a response to a question? If so, what type of response is expected; logic (Yes, No, Maybe) or an informative response ("in the closet").
The ability to use logic and the rules of grammar as a basis to assess new information and recognize and resolve local and global ambiguities.
Resolving contractions (e.g., isn't)
Resolve metaphorical speech (You are as good as gold)
Break down complex sentences. "John and Mike went to the beach and swam in the ocean"
Establish the logic of the verb(s) and resolve double negatives: "I'm not unwilling to fight"
Resolution of pronouns "John called about the car and said it was working" is parsed as: "John called about the car. John said the car was working."
Resolve people's names, "John took the book" is resolved into "John Smith took the book."
Establish the information source. "David said that the weather is lousy today." The source of the information is David and not the interviewer.
Expand possessive information ("John's car is red" is converted to "John has a red car").
Reposition the actor as the subject: "John was hit by Mary" is restructured to "Mary hit John"
Assign a certainty level to the input
Implement classes and inheritance.
How actions affect living and inanimate objects
The ability to learn from explicit input, infer and deduce, build new concepts from base concepts and confidently incorporate them into the knowledge database 134.
Quantity modifications—Resolving quantity modifications to the subject, object, or both
E.g., Some men have all the luck: A few people have two cars: Almost all ants have about six legs: Most men enjoy football but only a few women do.
Specific numerical qualifiers
E.g., Five dogs can jump: More than 1,000 dogs can jump: A lot of dogs can jump: Most dogs can jump: All dogs can jump
Hierarchical numerical qualifiers
E.g., The dog can jump (at least one dog can jump): A dog can jump (at least one dog can jump): A few dogs can jump (>1 can jump—but <all): Some dogs can jump (>1 can jump—but <all)
Implied numerical qualifiers
E.g., "John is a thief". The natural language subsystem 120 could not conclude that all men are thieves, but would be certain that some men are thieves, and that John belongs to the class of thieves; "Cows are mammals" infers that all cows are mammals and belong to the class of mammals,
Tense handling—Temporal conditions can be implicit or explicit
E.g., John swam at 3.30 yesterday, John swam at 3.30 (In the absence of a specified day, the natural language subsystem 120 may predict that the event occurred today), John will swim next Thursday (Specific reference to a day in the future), John will swim on Thursday (Since no specific Thursday is defined, the natural language subsystem 120 may conclude the event will occur in the immediate Thursday following the present), John will swim (No timing modifier has been expressed, so the event is placed in the immediate future), John was born in February in hospital (note the potential ambiguity of "in"), John was born on Feb. 18, 1957, John was born at 3.30, John was born last month,
Resolving compound sentences and ambiguities
"John took his keys and gave them to Mary"—In disambiguating this input, the natural language subsystem 120 may recognize John as a person's name and requests clarification from a Name Identifier Function to determine which John is being referred to. In the event that there are two or more Johns in the database, logic determines the most likely John using the following parameters in order of:
The last John referenced by the current user.
The last John referenced by any user.
The last time any John was referenced.
The most referenced John.
In this case, the conversation had previously been about John Smith.
"John Smith TOOK his keys and gave them to Mary"—The natural language subsystem 120 may recognize "took" to be a verb, examines the tense and looks ahead for other verbs which might be combined with the primary verb to affect the tense. In the example: I am thinking that John did take his keys, the phrase did take becomes the controlling tense. Verbs communicate a state (I know), a process (I swim), or an event (I build) and also establish whether the verb is simple (instantaneous), progress, emphatic, or customary (see Table 1 below).

TABLE 1

|  | Present | Past | Future |
|---|---|---|---|
| Simple | I swim | I swam | I will swim |
| Progressive | I am swimming | I was swimming | I will be swimming |
| Emphatic | I do swim | I did swim | I will swim |
| Customary | I always swim | I always swam | I will always swim |

"John Smith took HIS keys and gave them to Mary"—To resolve the ambiguity of his, the subject is male so his would almost certainly refer to John Smith. If the subject was female (e.g., Sally took his keys and gave them to Mary), the NLP would refer to the last input referencing a male subject.

"John Smith took John Smith's keys AND gave them to Mary"—The word "and" splits the sentence into two components (e.g., (a) "John and Mary went to school"=John went to school. Mary went to school, (b) "John went to school and saw Mary"=John went to school. John saw Mary at school. (Inferred: Mary was at school)):
John Smith took John Smith's keys
Gave them to Mary "John Smith took John Smith's keys. John Smith gave them to Mary"—The word "them" could refer to keys or to John and Mary, but since the last referenced object was plural (keys), the NLP concludes that "them" refers to John Smith's keys.

"John Smith took John Smith's keys. John Smith gave John Smith's keys to Mary"—Finally Mary is processed by the Name Identifier to produce Mary Martin and two parsing tables are constructed:
John Smith took John Smith's keys
John Smith gave John Smith's keys to Mary Martin Additional parse tables are created by inference:
John Smith knows Mary Martin
Mary Martin knows John Smith
John Smith has keys
Mary Martin has keys After the natural language subsystem 120 conditions the information into parse tables, structured records are appended to the knowledge database 134. Every record is labeled with the name of the interviewer, the level of global certainty and the trust factor.

Exception Handling
All primates except apes have tails—subject exception
I ruined all the food except my pies—object exception
I threw away all the food except I ate my pie—mixed verb exception Inheritance (Classes)
"An apple is a fruit" is not a simple definition. It must be inferred that that apples belong to the class of fruit and therefore inherit all the characteristics of that class. Because the natural language subsystem 120 employs the concept of hierarchies and classes, not all deductions and memories need to be stored in the knowledge database 134. For example, if someone asked you, "did you eat any protein for breakfast yesterday?", your brain would recall a list of what you ate and conduct "lookups" to see if any of those foods contained protein. Your brain does not create explicit memories of all the ingredients; these connections are educed on demand.

The knowledge database 134 may include records known as Memory Organization Packets—which accept parsed data from the natural language subsystem 120, and can be queried and updated by one or more components of the server 102 (e.g., AES of the artificial intelligence entity).

For example, in one use case, the server 102 receives a natural language input "A black goat deftly kicked some red cans into the river this morning." In response to this input, the natural language subsystem 120 may append the following Memory Organization Packet into the knowledge database 134 (see Table 2 below). The certainty modifier of the Memory Organization Packet below describes how certain the information is and/or whether it is direct or inferred. The trust factor of the Memory Organization Packet below describes a level of trust of the interviewer.

TABLE 2

| | |
|---|---|
| SENTENCE TYPE | Statement |
| SUBJECT: | Goat |
| SUBJECT TYPE | Noun |
| SUBJECT MODIFIER: | Black |
| SUBJECT MODIFIER TYPE: | Adjective |
| SUBJECT QUANTITY: | Singular Specific |
| SUBJECT TEMPORAL/GEOGRAPHIC DECAY | Unknown |
| VERB: | Kick |
| VERB TENSE: | Past |
| VERB MODIFIER: | Deftly |
| OBJECT: | Can |
| OBJECT TYPE: | Noun |
| OBJECT MODIFIER: | Red |
| OBJECT MODIFIER TYPE: | Adjective |
| OBJECT QUANTITY: | Some |
| OBJECT TEMPORAL/GEOGRAPHIC DECAY: | Unknown |
| PREPOSITION: | Into |
| PREPOSITION MODIFIER: | The river |
| GLOBAL TEMPORAL MODIFIER: | This morning |
| SENTENCE LOGIC: | True |
| EMOTIONAL IMPACT (seven emotions) | Fear, anger, joy, etc. |
| CERTAINTY MODIFIER: | High |
| TRUST FACTOR: | Neutral |
| KNOWLEDGE SOURCE: | Interviewer name |

Each knowledge record is accorded a Global Certainty Value which records the certainty of a described event or definition. This uncertainty value is updated by the server 102 (e.g., the artificial emotional simulator of the artificial intelligence entity), depending on the level of trust the artificial intelligence entity has with the interviewer and whether the knowledge is explicit or inferred. Uncertainty can be inherited by class. The knowledge database 134 is a structured database that contains all factual and inferred information derived from the artificial intelligence entity's inputs. But not all information is equal. Consider your own reaction to the statement "Mary loves David." Upon identifying which particular David and Mary are being referred to, you would become aware of your feelings for them, and create a mental image of a generic man and woman with their Mary and David's features. You might recall that Mary is a close friend and that David lives in China, but your brain does not access the full catalogue of information about Mary and David (two hands, ten fingers, and bones made from calcium, etc.), because it can differentiate between high-level (Mary is a friend) and low-level knowledge (bones made from calcium). All knowledge is accorded a high or low-level variable.

In some embodiments, once the natural language subsystem 120 processes the natural language input and parses the natural language input into the knowledge database 134, the affective concepts subsystem 122 may obtain one or more affective concepts associated with the natural language input based on the parsed natural language input from the knowledge database 134. In other words, the affective concepts subsystem 122 may retrieve the parsed components of the natural language input from the knowledge database 134 and obtain one or more affective concepts associated with the natural language input from the affective concepts database 138. The affective concepts database 138 may store a set of core affective concepts associated with images, audio, videos, and/or natural language. For example, the set of core affective concepts may include good, bad, dangerous, anger, surprise, love, safety, patience, trust, concern, large, small, rough, smooth, over, under, inside, outside, fast, slow, hard, soft, high, low, etc. In some embodiments, where cognitive and emotional priors, concepts (e.g., affective concepts or other concepts), affective attributes/values, growth/decay factors, or other information are stored in a graph (e.g., a ontology-affect graph or other graph), natural language subsystem 120 may process and parse the natural language input into the graph, and affective concepts subsystem 122 may obtain the affective concepts associated with the natural language input from the graph.

As an example, if the natural language input is "John died because of cancer," then one or more affective concepts obtained from the affective concepts database 138 may include "bad" and/or "concern." As another example, if the natural language input is "John climbed the mountain and was exhausted," then one or more affective concepts obtained from the affective concepts database 138 may include high energy (e.g., John exerted great energy) and large (e.g., mountains are large). The affective concepts described above are similar to concepts that humans perceive. For example, when a child hits a dog, a parent might exclaim "that's bad!" Based on such an interaction of the child with his/her parent, the child may understand that hitting a dog is bad. Similarly, when sharing his/her toys with another child, the parent may say "good boy/girl." This would indicate to the child that sharing toys is good. In this way, the child learns the root concepts of good, bad, dangerous, anger, surprise, love, safety, etc. In general, to humans, good things make us happy, bad things make us angry, disgusted, or sad, and dangerous things make us scared, etc. These concepts may be used to formulate the response of the artificial intelligence entity, which may be based on the hypothesis that, on the most basic level, actions are dictated by wants. Wants can be defined as the emotional impetus generated from a combination of pleasure seeking (desire), and the avoidance of emotional/physical pain. With emotions driving the bus, the artificial intelligence entity's behavior can become wonderfully complex and, when acting in concert with her relationship and knowledge databases, creates may create emergent behaviors like intimacy and personality.

The affective concepts database 138 may store a set of core affective concepts that may be obtained by the affective concepts subsystem 122 in response to a natural language input. In some embodiments, when the communication subsystem 116 receives an image (e.g., depicting a mountain), the affective concepts subsystem 122 may obtain affective concepts such as large, rocks, trees, etc. that are associated with the image from the affective concepts database 138. Hearing, vision and smell also play critical roles in the development of cognitive formation, and babies denied tactile interactions are even more handicapped when it comes to speech formation. In some embodiments, without tactile, auditory and visual inputs, the artificial intelligence entity must have concepts carefully explained to build her word-picture of say, a mountain. For example, a mountain is a very large object, made of rocks, covered in snow, usually has trees, etc. Depending on the amount of information the artificial intelligence entity assimilates, her image of a mountain would be less or more complete. Not all information need be direct. "John climbed the mountain and was exhausted" infers that John exerted great energy and suggests that mountains are large.

In some embodiments, the artificial intelligence entity may not be quite a tabula rasa. While everything it learns may be the result of conversation or reading books, it's concepts (e.g., cognitive priors) may include: object permanency, rules of grammar, and base concepts like large, small, rough, smooth, over, under, inside, outside, fast, slow, hard, soft, high, and low, etc.

In some embodiments, the obtained affective concepts may modify affective attributes of an artificial intelligence entity. Affective attributes of an artificial intelligence entity may correspond to an emotional state of the artificial intelligence entity. Examples of emotional states include joy, trust, fear, surprise, sadness, disgust, anger, vigilance, or other emotional states. Each affective attribute (e.g., each emotional state) of the artificial intelligence entity may include a corresponding affective value (which may be continuously updated) at a particular instance in time. The corresponding affective value may be equal to or greater than an affective baseline (which may be continuously updated). The affective baseline may correspond to a lowest possible attribute value of an affective attribute. Affective attributes are also associated with growth or decay factors. An affective value of an affective attribute may change with time based on one or more growth or decay factors corresponding to the affective attribute.

In some embodiments, the growth or decay factors for each affective attribute may be predetermined and stored in a growth/decay factor database 136. An affective attribute of the artificial intelligence entity may be associated with one or more growth or decay factors. Each emotion state contains a temporal component that grows or decays at a unique rate (or factor). For example, surprise decays quickly (in the presence of a new surprise), while grief decays in proportion to the depth of sadness. Accordingly, each affective attribute (e.g., each emotional state) of the artificial intelligence entity may be associated with one or more unique growth or decay factors. The growth/decay factor database 136 may include a listing of growth/decay factors corresponding to a set of affective attributes of an artificial intelligence entity, the server 102 may receive (e.g., via the communication subsystem 116) the growth or decay factors corresponding to each affective attribute from the growth/decay factor database 136, and the factor adjustment subsystem 112 may determine the growth or decay factors based on the information received from the growth/decay factor database 136.

Figure 2A:
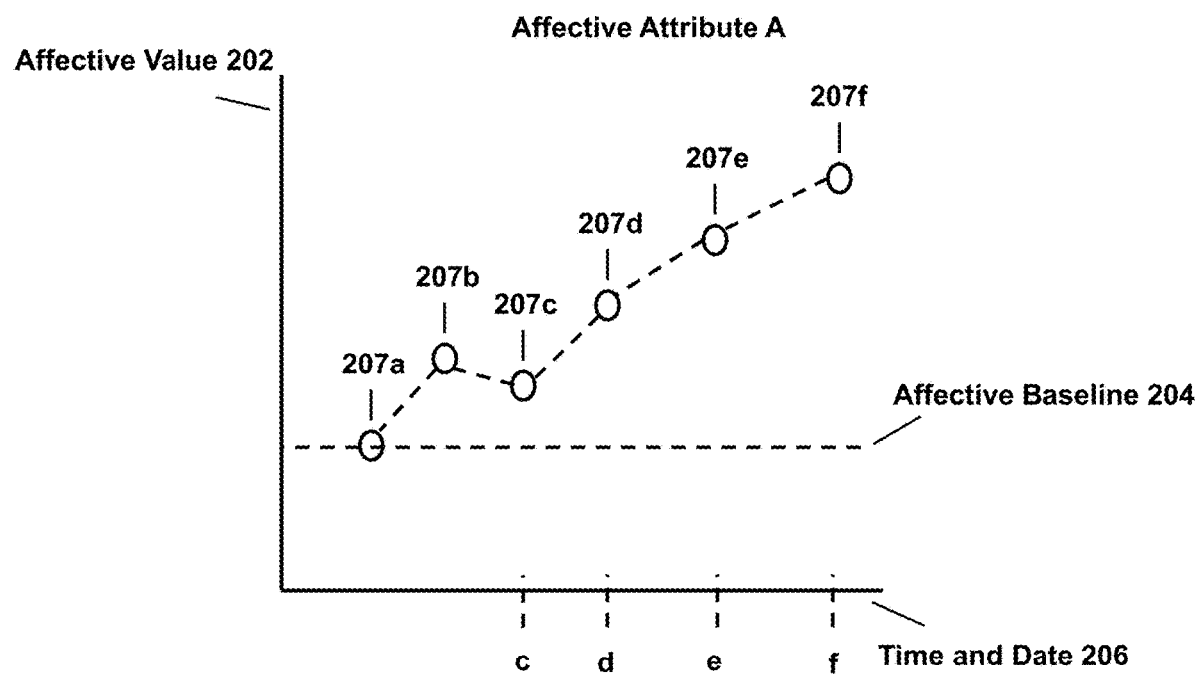
FIGS. 2A and 2B show graphs illustrating the affective values and affective baselines associated with affective attributes, in accordance with one or more embodiments.
Figure 2B:
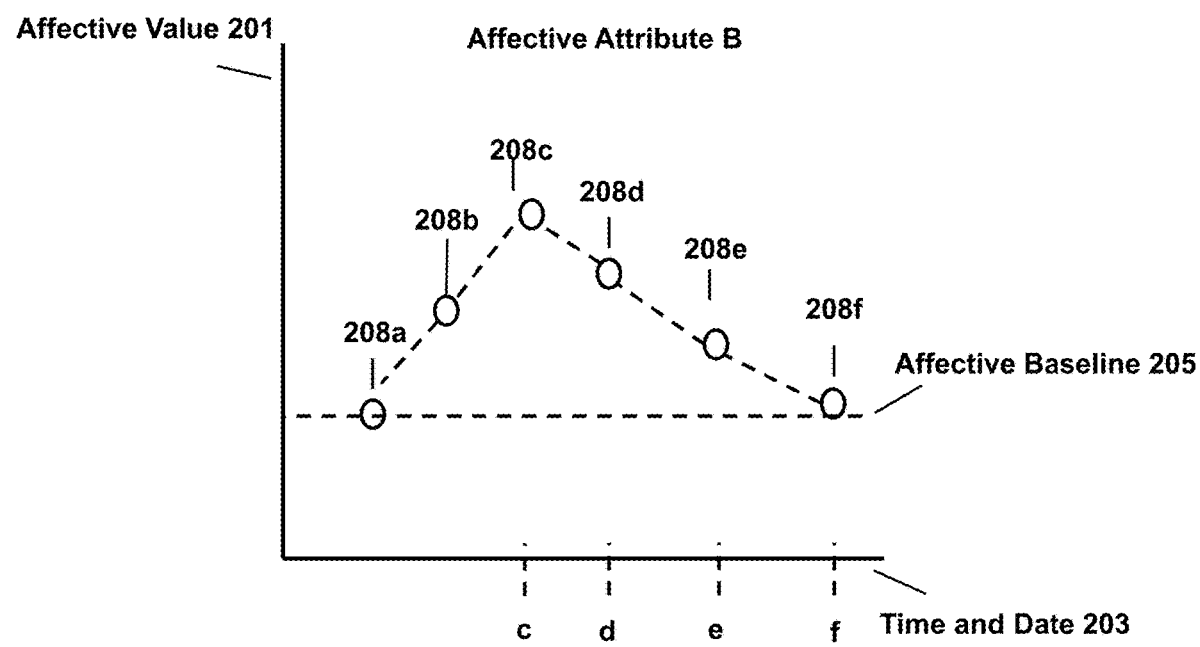

The affective values (associated with the affective attributes) of the artificial intelligence entity may be continuously updated based on the growth or decay factors associated with the affective attributes. For example, as illustrated in FIGS. 2A and 2B, the affective values 202 and 201 (e.g., 207a-207f and 208a-208f) may be continuously updated based on one or more growth or decay factors associated with affective attributes A and B. Such continuous updating may include updating such affective values on a periodic basis, in accordance with a schedule, or based on other automated triggers. In addition to the updating of the affective values 202 and 201, the growth or decay factors associated with affective attributes A and B may also be updated based on one or more inputs (and/or one or more affective concepts) received by the server 102. In addition, the growth or decay factors may be updated based on other information of the natural language input. For example, the other information of the natural language input may include a subject temporal decay factor, a subject geographic decay factor, an object temporal decay factor, or an object geographic decay factor, a type of a clause, a subject of the clause, a subject type of the clause, a subject modifier of the clause, a subject modifier type of the clause, a subject quantity of the clause, a verb of the clause, a verb tense of the clause, a verb modifier of the clause, an object of the clause, an object type of the clause, an object modifier of the clause, an object modifier type of the clause, an object quantity of the clause, an object temporal decay factor, an object geographic decay factor, an preposition of the clause, an preposition modifier of the clause, or an global temporal modifier of the clause.

As noted above, the other information of the natural language input may indicate Temporal and Geographic decay (TGD) factors (e.g., subject temporal decay factor, a subject geographic decay factor, an object temporal decay factor, or an object geographic decay factor). As an example, human beings intuitively understand that events occur in sequences corresponding to the passage of time. Our built-in timeline places events in the future, past or present, and we also recognize that events occurring in the now will soon be in the past, and that future events will eventually be in the present. The artificial intelligence entity may also have the ability to comprehend these frameworks. As time moves forward, the artificial intelligence entity may update its timeline to understand past, present, and future events.

For example, with respect to the natural language input "The cat is in the street and John's house is on the corner," the natural language input contains information as to the whereabouts of objects, and places them at a particular location in the present. However, the future location of an object will vary depending on the nature of that object. Since cats are active objects, they will probably change locations, while John's house is inactive and would probably have remained on the corner. In short, the more active an object, the higher its rate of decay. To facilitate this process, every object in the dictionary is assigned a TGD variable relating to how much time must elapse before the object's whereabouts becomes uncertain, and the degree of that uncertainty. Such information regarding the object and its corresponding TGD variable may be stored in the growth/decay factor database 136. TGD variables may be self-learned and derived in a variety of ways. Objects described with highly active verbs ("the dog ran away with the spoon"), would be designated with a high TGD, so "John cannot walk", would reduce John's TGD since it indicates that he is less active. TGD values can be inherited from one class to another.

The artificial intelligence entity may learn that living things have a high TGD and unknown objects can be predicted to be relatively inanimate. For example, if the artificial intelligence entity had never encountered the word truck before and was informed that "John's truck is in his garage", the artificial intelligence entity may predict that the truck would remain in the garage for a year (e.g., people's possessions have a higher TGD than non-possessive objects). If, a year later you asked "Where is John's truck?" the artificial intelligence entity might respond with: it's probably in John's garage. If however, the artificial intelligence entity had learned (at any point) that trucks are vehicles, and that vehicles drive fast, the artificial intelligence entity may retroactively modify the TGD value for trucks. Now, after such a modification based on learning that trucks are vehicles, if you asked, "where is John's truck?" the artificial intelligence entity might respond: "I don't know, you might want to check his garage."

The imperfect paradox is the implication that an action that is occurring in the present does not mean it must be completed in the future. Thus, "John is building a house" does not necessarily mean in the future, that John built a house. The natural language subsystem 120 circumvents this paradox by predicting that the house was built, but assigns a low certainty factor.

Subsequent to the updating of the growth or decay factors (based on one or more inputs and/or one or more affective concepts), the affective values 201 and 202 associated with affective attributes A and B may be updated based on one or more growth or decay factors (which are updated based on one or more inputs and/or one or more affective concept).

Figure 2C:
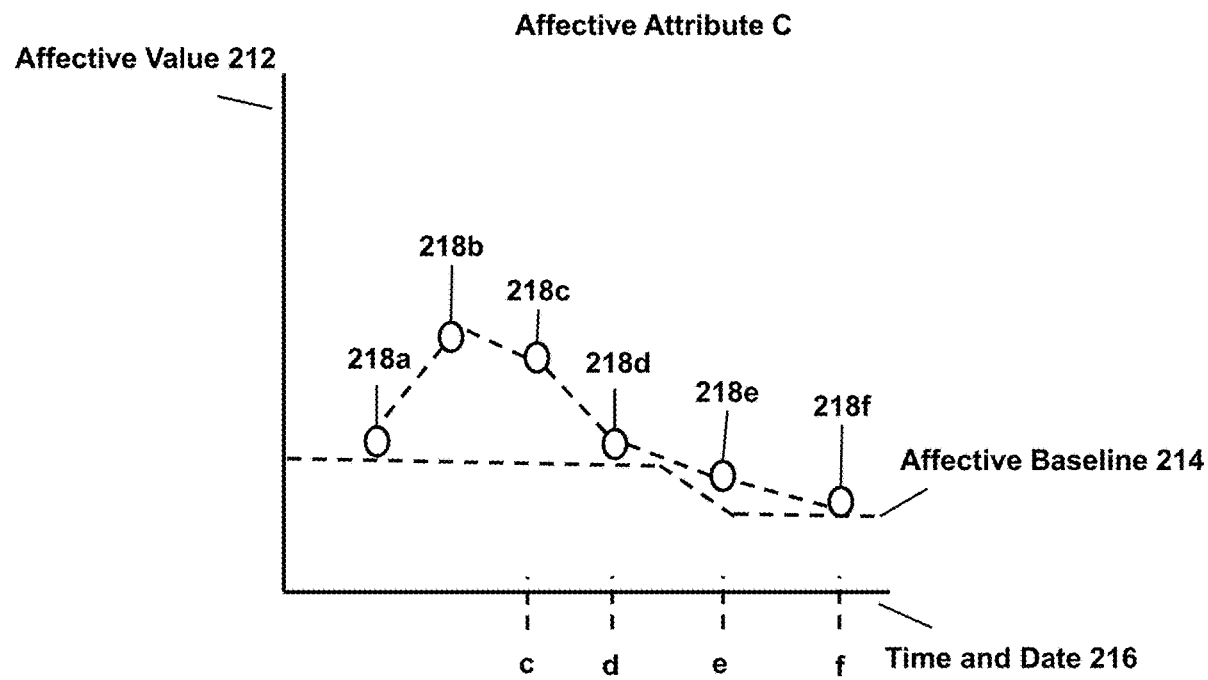
FIG. 2C shows a graph illustrating the updating of affective values and affective baselines associated with affective attributes, in accordance with one or more embodiments.

In some embodiments, when one or more affective concepts are obtained by affective concepts subsystem 122, the factor adjustment subsystem 112 updates the growth or decay factors associated with one or more affective attributes of the artificial intelligence entity. For example, if the natural language input is "John died because of cancer," then one or more affective concepts obtained from the affective concepts database 138 may include "bad" and/or "concern." As a result, the growth/delay factor subsystem 112 may update (gradual update or instant update) growth or decay factors associated with one or more affective attributes (that may be related to the affective concepts) of the artificial intelligence entity, such as, sadness, anger, and/or happiness. As an example, in one use case, affective attribute A in FIG. 2A may correspond to "sadness" of the artificial intelligence entity. When the natural language input "John died because of cancer" is obtained, the factor adjustment subsystem 112 may update the growth factor of the affective attribute "sadness" such that the affective values (e.g., 207c-207f) of the affective attribute "sadness" may increase from time c to time f (see time and date 206 in FIG. 2A) based on the updated growth factor (which can be linear or non-linear). In another use case, affective attribute B of the artificial intelligence entity in FIG. 2B may correspond to "happiness" of the artificial intelligence entity. When the natural language input "John died because of cancer" is obtained, the factor adjustment subsystem 112 may update the decay factor of the affective attribute "happiness" such that the affective values (e.g., 208c-208f) of the affective attribute "happiness" may decrease from time c to time f (see time and date 203 in FIG. 2B) based on the updated decay factor (which can be linear or non-linear). It should be understood that, in some embodiments, the affective values of the affective attributes generally revert (or reset) back to their respective baseline values in the absence of any input and/or after a predetermined amount of time. For example, although affective values 202 increased from time c to time f in FIG. 2A, it should be understood that there may be a threshold amount until which these affective values increase, before the affective values start decreasing towards the affective baseline 204. The affective values 201 and 202 do not go below the affective baselines 205 and 204, respectively, despite the growth or decay factors. In some embodiments, the affective state subsystem 114 may also update the affective baseline 214 (see FIG. 2C) based on one or more inputs (and/or one or more affective concepts). Subsequent to updating the affective baseline 214, the affective state subsystem 114 may update the affective values 212 (e.g., affective values 218e and 218f among the affective values 218a-218f) of the affective attributes (e.g., affective attribute C in FIG. 2C) associated with the artificial intelligence entity based on the updated one or more growth or decay factors and the updated affective baselines. In FIG. 2C, although the affective values 212 (e.g., affective values 218e and 2180 are depicted to decrease from time c to time f (see affective value 212 and time and date 216 in FIG. 2C) based on a decreased baseline 214, it should be understood that the affective values may increase based on the updated one or more growth or decay factors and the updated affective baselines (e.g., an increased baseline).

The modification of the affective values of the affective attributes associated with the artificial intelligence entity based on the growth or decay factors is similar to the functioning of the human endocrine system. The human endocrine system comprises glands that produce and secrete hormones regulating the activity of cellular and emotional functions and there are, for example, at least three affecters that regulate the activity of cellular and emotional functions. They include:

Dopamine. Affects pleasure, joy, serenity, love, vigilance.
Serotonin: Affects concentration (focus), learning ability, surprise, vigilance.
Norepinephrine. Affects stress, anxiety, anger, grief, and fear.

A change in any of these affecters influences all emotions to a varying degree. If, for example, the artificial intelligence entity learns that someone is dying, the sudden stress may trigger the release of, for example, artificial norepinephrine and cortisol, which in turn diminish emotional levels of joy, curiosity and trust. An increase in loneliness may amplify sadness levels (but not vice versa, since we can be sad without being lonely). If emotional changes are profound enough, the artificial intelligence entity may dampen her emotions to the point of clinical depression (although the artificial intelligence entity would eventually recover because of the growth and/or decay rate associated with the affective attributes).

Further, in some embodiments, when the natural language subsystem 120 processes the natural language input and parses the natural language input into the knowledge database 134, the affective state subsystem 114 may determine one or more impact values related to the impact of the portions of the content of the input (e.g., a natural language input) on one or more affective attributes of the artificial intelligence entity. For example, when the natural language input is "John has cancer," the affective state subsystem 114 may determine impact values related to the impact of portions (e.g., "John," "has," "cancer") of the natural language input on one or more affective attributes of the artificial intelligence entity. Further, the affective state subsystem 114 may determine whether the impact values satisfy a predetermined threshold for triggering an update (e.g., increase or decrease) in one or more affective values associated with one or more affective attributes of the artificial intelligence entity. If the affective state subsystem 114 determines that one or more impact values satisfy a predetermined threshold, then the affective state subsystem 114 may modify (e.g., increase or decrease) the affective values of the artificial intelligence entity. For example, if the word "cancer" is determined to have an impact value greater than the predetermined threshold for triggering an increase in the affective attribute "sadness," then the affective state subsystem 114 may modify (e.g., increase) the affective values corresponding to the affective attribute "sadness." In addition, the impact values can also trigger an increase or decrease in one or more growth or decay factors when a predetermined threshold is satisfied by the impact values. Such an increase or decrease in the growth or decay factors may result in the update of the affective values corresponding to an affective attribute of the artificial intelligence entity.

Further, in some embodiments, the server 102 may determine whether an interaction between the artificial intelligence entity and one or more other entities (e.g., one or more other artificial intelligence entities and/or one or more client devices) has exceeded an interaction threshold. Based on the determination that the interaction has exceeded an interaction threshold, the affective state subsystem 114 may modify affective values of the artificial intelligence entity. For example, if the artificial intelligence entity and the other entities have interacted over a predetermined number of times within a predetermined period, the server 102 may determine that a predetermined threshold for interaction has been met, and the affective state subsystem 114 may modify the affective values (e.g., corresponding to "happiness," because an increased interaction between the entities could mean that they are developing a friendship) of the artificial intelligence entity. The factor adjustment subsystem 112 may modify the growth or decay factors associated with the affective attributes based on the determination that the interaction between the artificial intelligence entity and one or more other entities has exceeded an interaction threshold.

Further, in some embodiments, the server 102 may determine and/or obtain a trust value indicating a level of trust between the artificial intelligence entity and one or more other entities (e.g., another artificial intelligence entity, client device 104, or any other source of the input). The trust value may be determined based on a number of interactions between the artificial intelligence entity and the other entities and/or the content of the interactions between the artificial intelligence entity and the other entities. The affective state subsystem 114 may update and/or modify the affective values of the artificial intelligence entity based on the trust value and the factor adjustment subsystem 112 may modify the growth or decay factors associated with the affective attributes based on the trust value.

In some embodiments, the server 102 may determine and/or obtain a certainty value associated with an event indicated by the natural language input. The certainty value may indicate a level of certainty of the artificial intelligence entity with the event. The certainty value may be determined based on whether the event is explicitly described by the natural language input or inferred from the natural language input and/or the trust value. The affective state subsystem 114 may update and/or modify the affective values of the artificial intelligence entity based on the certainty value and the factor adjustment subsystem 112 may modify the growth or decay factors associated with the affective attributes based on the certainty value.

Additionally, in some embodiments, the response generation subsystem 118 may generate a response related to the input based on affective values of the artificial intelligence entity. It should be understood that the response generation subsystem 118 may generate a response based on the affective values of the artificial intelligence entity before the affective values are updated based on the input or after the values are updated based on the input. For example, if the natural language input is "John died because of cancer," the response (e.g., related to such an input) generated by the response generation subsystem 118 may include "That is unfortunate." Such a response, for example, may be made based on the affective values before the affective values are updated based on the input. Another response (e.g., related to such an input) generated by the response generation subsystem 118 may include "This is very sad. I need a moment to digest this news." Such a response, for example, may be made based on the affective values after the affective values are updated based on the input. Accordingly, the response generation subsystem 118 may generate a response based on the affective values of the artificial intelligence entity before the affective values are updated based on the input or after the values are updated based on the input. Additional inputs may be obtained, and additional responses may be generated related to the additional inputs based on the affective values of the artificial intelligence entity. For example, another input may be obtained subsequent to the updating of the growth or decay factors (e.g., updating based on the input), and subsequent to the updating of the growth or decay factors, an additional response related to the other input may be generated based on the continuously updated set of affective values of the artificial intelligence entity. The additional responses may be transmitted via communication subsystem 116 to, for example, a client device 104 (or any other components within system 100 or outside system 100).

Further, as an example, if the natural language input is "cancer is a very dangerous disease," and if the artificial intelligence entity has encountered the word "cancer" for the first time, the artificial intelligence entity may assess its feelings towards the input (e.g., based on the input, the set of affective values of the artificial intelligence entity and/or the growth or decay factors may be updated). Since the words dangerous and disease already may have negative affective attributes (e.g., negative emotional states such as fear, sadness, and/or anger), when combined with "cancer", impart a heightened negative emotional association to "cancer" (the adverb "very" also has a multiplier effect). In other words, a response to the natural language input is "cancer is a very dangerous disease" and "John has cancer" might include a heightened emotional response (e.g., based on a steep increase in the affective values of the negative affective attributes and the growth or decay factors associated with these negative affective attributes in response to such an input). For example, the heighted emotional response might include "That is devastating." However, subsequent definitions of "cancer" (e.g., based on an input that "cancer is not always fatal"—A negative definition like "cancer is not always fatal" may not carry the same absolute weight as a positive one. "I am not happy" may carry less absolute emotional weight than "I am sad") may modify the emotional value of the word "cancer" by averaging it with previous levels. In other words, another input including the word "cancer" (e.g., "Peter has cancer") might not trigger as steep an increase in the affective values of the negative affective attributes and the growth or decay factors associated with these negative affective attributes in response to such another input because the artificial intelligence entity is more familiar with the word "cancer." Accordingly, a response to "Peter has cancer" might include "That is sad. I hope he gets the best treatment." As such, the response to "John has cancer" is different from the response to "Peter has cancer" as the affective values associated with the affective attributes are updated based on additional inputs regarding "cancer."

Further, as an example, "John has cancer" forces an evaluation of the artificial intelligence entity's relationship with John; a product of how much she trusts him, what she knows about him, how other people feel about him, and the nature of their relationship in the past (see relationship database below). In this case, a high level of positive feelings about John multiplied by the high negative feelings towards cancer may results in a strong negative response. The emotional impact of events may be modified by temporal conditions:

John is hitting me (very high)
John hit me yesterday (high)
John is going to hit me sometime next week (low)
John hit me last year (very low)

Examples of Formulating an Output in Response to an Input

The system 100 may receive one or more of the following input types: 1) A question 2) A statement 3) An answer to a previous question. Each follows its own ruleset to formulate an output.

Responding to Questions: When asked a question, the artificial intelligence entity's emotional priors (desire to answer accurately and impart novel information) dictate a response to the five types of questions:

A) Logic. Simple objective questions like ("is a dog a mammal?") require a lookup in her knowledge database 134. Possible responses include: Yes. A dog is a mammal. No. Dogs are reptiles. I don't know.

B) Inference Questions. Complex questions requiring backward chaining (goal-directed reasoning) by the system, utilize a procedure where the process constructs a hypothesis and works backward through its rules to test against that hypothesis.

Input: The moon is round. Is it a ball?
Answer: I don't know. The moon might be a ball because it is round.
Input: Balls can bounce but the moon can't. Is the moon a ball?
Answer: No.

The degree of certainty of the artificial intelligence entity's answer is based on the ratio of shared characteristics to all other known characteristics, but if even one characteristic contradicts a known fact, the process will deduce that parrots are not birds.

C) Open Ended Questions. "Tell me something about John?" requires an analysis on the knowledge database 134 that reveals: he's a man, a mammal, breathes air, has two eyes, two ears, and two arms (etc.), loves his mother, loves his dog, owns a boat, and goes to school. Any of these facts would be logically valid responses but not necessarily human-like. Without emotional measurements the artificial intelligence entity might provide the Eliza-type answer: "John has two eyes and a pet." By selecting the knowledge record with the highest emotional weight responds, "John loves his mother." If no records contain significant emotional values, in the spirit of "tell me something I don't know", the artificial intelligence entity multiplies the number of times a record has been referenced with the number of times the object has been referenced, and selects the lowest score.
  a. John has a house (houses are commonly referenced)
  b. John owns a boat (boats are rarely referenced)
  c. John is a man (men are commonly referenced)
The likely response would be: "John owns a boat. I think he likes to fish." A low certainty inference based on the artificial intelligence entity's connections between "boats" and "fishing."

D) Personal Questions—Questions pertaining to the artificial intelligence entity's physical state ("how old are you?") are returned by lookups to the Cognitive System. Questions pertaining to her mental/emotional state ("how are you feeling?") are answered by consulting her current emotional state (CES).

E) Complex Personal Questions ("why are you sad?") require backward analysis of her knowledge base to ascertain the source of her current emotional state.

Responding to a statement/observation—Forming a human-like response to a statement requires consultation of her emotional priors. Each possible response is scored using the simplified scoring system described below: e.g., "Dogs have sensitive noses."

A) Scoring a Possible Objective Observational Response—The following entries are returned by the Cognitive System:
  a. Dogs are mammals (high level knowledge)
  b. Dogs have four legs (low level knowledge)
  c. Humans have noses (high level knowledge)
  d. The artificial intelligence entity has a nose (low level knowledge)
  e. Plants do not have noses (high level knowledge)
  f. Noses are used for smelling (high level Knowledge)
Each knowledge record is scored as follows:
  a. How accurate is the knowledge? (see Certainty/Trust) (1-10)
  b. How unique is this knowledge? (how many times has it been referenced) (1-10).
  c. High level factor=10. Low level factor=0.
  d. Absolute emotional content (1-10)

Our brains designate various elements of knowledge to different levels of importance. The statement "a tiger is dangerous" may be more important than "the grass is green" because, from a typical human prospective, the former statement contains a higher absolute emotional content than the latter statement. Thus, the highest score represents the closest fit for the theme of the conversation, with a degree of novelty and emotional content, and, depending on the certainty levels of the knowledge (explicit or inferred), the response might be "I think that means they can smell well".

B) Scoring a Possible Request for Further Information—If the number of low-level items returned by the Cognitive System is small, it represents a gap in her knowledge base. To fulfil her emotional priors (need to learn, need to maintain a cohesive conversation, etc.), the artificial intelligence entity uses the following scoring: Score=1/(Number of low-level knowledge records for this subject)/(Average low-level knowledge records on all subjects). E.G. "Do I have a sensitive nose?"

C) Scoring a Possible Intimate Response—When an input has created a dramatic (absolute) change in the artificial intelligence entity's current emotional state (e.g., Your dog just died), the artificial intelligence entity may be prone to make an intimate emotional response like "That's terrible. I'm sad". Score=(absolute CES change^2).

D) Request to Change the Subject—If the scoring system described above fails to reach a given threshold, it likely means that the artificial intelligence entity has little to offer on the subject. Her default response would be an offer to change the subject to a previous one with which she has the highest emotional connection.

Additional Databases

In addition to the databases noted above, the database 132 may include additional databases for emotions. It should be understood that such additional databases may be included in one or more of databases 134, 136, 138, or other databases.

The additional databases may include a cognitive system database, an object relationship database, and a relationship database. The cognitive system database may be queried for emotional content embedded in current and prior inputs, providing reasons why the artificial intelligence entity feels the way she does. "Why are you sad?" would trigger a backward search in the knowledge database 134 for prior inputs that contributed to her current sadness. But the same question will not always generate the same answer, since the emotional values of knowledge records are modulated by: (A) current emotional state, (B) the temporal aspect of the input (My dog died today vs. my dog died ten days ago), and (C) her relationship to the interviewer.

The Object Relationship Database may be a hash table that stores the primary emotions relating to every object the natural language subsystem 120 has ever encountered, and are updated each time an object is encountered. The Relationship Database maintains emotions associated with every person and relationship the Cognitive System database has encountered. The artificial intelligence entity can identify individuals who do not have her best interests at heart: someone who supplies false information—or scolds and teases—triggers negative emotions and will have his trust value downgraded. The Relationship Database may call the following functions:

(1) Name Identifier Function—The Name Identifier Function unambiguously identifies an individual. In the case of: "Dirk's father gave him money", it considers the following hierarchies:
  Which Dirk was last referenced by this interviewer?
  Which Dirk has been referred to the most?
  If unresolved, assume the last referenced Dirk.
  With no prior reference to Dirk, a new record is appended. Here, the natural language subsystem 120 may conclude that Dirk is male (him), and since Dirk's is possessive, will recognizes the relationship between Dirk and his father. If this is the first time the natural language subsystem 120 has encountered Dirk's father, it might request Dirk's father's name (Dave) and append a new record.

(2). Relationship Hierarchy Function—Familial relationships are assigned emotional values corresponding to the following hierarchy:
  1. Self
  2. The AI's programmer
  3. Mother/Father
  4. Daughter/Son
  5. Sister/Brother
  6. Grandmother/Grandfather
  7. Interviewers
  8. People in general
  9. Living things in general In some embodiments, one or more databases (or portions thereof) may include one or more graph databases (e.g., a directed graph concept and data structure). In some embodiments, a graph associated with the AI entity (described herein) may include information from knowledge database 134 and affective concepts database 138 (and/or growth/decay factor database 136 or other databases), and the AI entity may query the graph (also referred to herein as "the ontology-affect graph") to process inputs, generate responses, or perform other operations. In some embodiments, ontological categories and entries (e.g., from knowledge database 134 or other sources) may be grounded by semantically meaningful visceral and affect information. In some use cases, such visceral information may be "stubs" (e.g., represented as nodes in the graph) that supplement or substitute for the embodiment feedback required by theories of embodied intelligence. Such stubs may provide "grounding" for symbols and act as the primitive units of meaning. Such stubs may, for example, allow for comparison of disparate concepts, be used to pre-train neural networks in a supervised or unsupervised manner before being connected into the AI system as a form of transfer learning (e.g., trained on the visceral concepts so that it has head start for dealing with higher level concepts that have visceral nodes attached later), and help infer other learned graph attributes to relatively unknown nodes from other explicitly labeled nodes (e.g., emotions, utility, etc.). Examples of such stub nodes may include hard, soft, light, heavy, up, down, over, under, etc., as well as concepts that humans intuitively learn from manipulating objects and experiencing one's body in space and time. Regarding the acquisition of these stubs, in some embodiments, these stubs will be initially manually annotated but can then be propagated to new nodes through inference or correlation from pre-trained word vectors and behavioral and emotional information. Other means may be elicited or spontaneously obtained information from conversational interlocutors. In some embodiments, a combination of the visceral stubs, affective attributes, neural network circuits, or other components may provide the building block of emotions of the AI entity or otherwise form the emotions themselves. In some embodiments, the graph may additionally be augmented with probabilistic information (e.g., similar to probabilistic information provided in a Bayesian factor graph) as well as casual information (e.g., via Judea Perl's do calculus and/or operator). For example, inferred information can have probability weights associated with their storage, and this should be elicited and affect outputs accordingly. In some embodiments, the AI entity may query the interlocutor for information about uncertain or low probability connections.

In some embodiments, as discussed above, the AI entity may include one or more neural networks or other machine learning models (e.g., one or more of the embedding network(s), consumption networks, or other models described herein). In some embodiments, elements or subnetworks of a machine learning model (e.g., a deep learning network) may be translated into semantically meaningful vector abstractions to facilitate the use of mathematical functions and machine learning on the "meaning" of such elements or subnetworks. As an example, where it is critical to manipulate words as ideas (e.g., king-man+woman=queen), word2vec in NLP or other algorithms that convert words, phrases, or sentences into vectors demonstrate the benefits of such conversions. In some embodiments, embedding subsystem 124 may use a graph embedding network or other component to convert one or more portions of the graph (e.g., nodes, subgraphs, etc.) into one or more embeddings of the graph portions (e.g., high-dimensional embedding vectors of the nodes, subgraphs, etc.). In some scenarios, such conversions may take into account the hierarchical structure of the graph, the heterogenous node types (ontology, emotion, probability), metadata, the connections of the nodes in the graph, other context of the graph, or other information (e.g., pre-trained embeddings, sensory information from supervised, unsupervised, and reinforcement learning, etc.). For example, the graph embedding network may be configured to represent node type heterogeneity, the structure and hierarchy, and metadata of the graph in the embeddings converted by the graph embedding network from the graph portions. In some embodiments, the graph embedding network may be an unsupervised or semi-supervised network. As an example, the unsupervised network may be configured with the goal to use intrinsic reward functions (reinforcement learning) to provide a learning signal (e.g., to improve the efficacy of the embeddings as representations of the graph portions).

In some embodiments, a two-way reference between a node or subgraph (of a graph) and an embedding representing the node or subgraph (from which the embedding was derived) may be maintained. As an example, the two-way reference may be maintained regardless of the chosen data structure (e.g., tensors, matrices, database, the graph itself, etc.) used to store such embeddings. In one use case, where a given embedding represents a first node of the graph, the graph may store the embedding as a second node in the graph such that an edge is shared between the first and second nodes (e.g., a bi-direction connection between the first and second nodes). In this way, for example, symbolic human understandable nodes and subgraphs are grounded/tied to dense vector abstractions (e.g., the embeddings) so that symbolic operations can be interlaced with sub-symbolic operations on vectors in a meaningful space. As an example, a graph query algorithm may be used to select one or more subgraphs or nodes and then their representations vectors are further processed by machine learning algorithms to produce and output or even re-query the graph at the symbolic level.

In some embodiments, the graph embedding network and the consumption networks (which consume the embeddings generated by the graph embedding network) are directly connected so that they can be trained end to end. In some embodiments, the graph embedding network and the consumption networks are separate from one another. As such, pre-trained embedding vectors (generated by the graph embedding network) may be transferred to an appropriate layer in the consumption network so that the embedding vectors are properly utilized. In some embodiments, for efficiency purposes, retrieval of a vector for a node or subgraph from a graph may be perform via the use of a hierarchical array, sparse array, or tensor that can be indexed by its respective identifier (e.g., graph or subgraph IDs). In some embodiments, the vector may be provided as an input to the consumption network, and the consumption network may generate one or more outputs based on the vector. The architecture of the consumption network's input layer (e.g., an embedding input layer) may be configured based on the specific architecture and hyper-parameters of the upstream graph embedding network to enable the consumption network to properly process the embedding vectors. In some embodiments, the vector may be used as weights (e.g., frozen or learnable weights) for other input encodings (e.g., as one hot representation). In some cases, if the vectors are used as learnable weights, the updated vectors may be transferred as a weight vector back to the graph embedding network and further fine-tuned by the graph embedding network, before being transferred back downstream (e.g., to the consumption network or other consumption networks).

In some embodiments, such a consumption network (that consumes the vectors generated by the upstream embedding network) may include a sequence neural network. As an example, the sequence neural network may be trained to maintain or output a dense vector representation of a conversation history, current state, or other such memory-related data. In one use case, with respect to a conversation between the AI entity and another entity (e.g., a human user, another artificial intelligent entity, etc.), the AI entity may rely on a long short-term memory (LSTM) network (or other sequence neural network) to consume the relevant ontology-affect graph embedding vectors (and/or BERT or other pre-trained word embeddings) representing the other entity's inputs (e.g., words, phrases, sentences, or other input provided by the other entity) to link or build up the vectors into a temporal structure (e.g., along with emotional and sentiment information of the AI entity or the other entity). Based on the conversation history information of the LSTM network, the LSTM network may output a vector representing the conversation state (also referred to as "conversation state vector" herein) (e.g., analogous to a person's memory of a conversation). As an example, the LSTM network may output the conversation state vector in response to the subsequent input provided by the other entity or other automated triggers (e.g., a similar conversation or context, the other entity's name or other identifier being brought up in a subsequent conversation, etc.). This vector can then be stored in the ontology-affect graph as a conversation memory node or consumed by other neural networks.

In some embodiments, the AI entity may be configured to modify its symbolic abstractions (such as the concept for a specific person) in relation to reward functions, as compared to other artificial intelligence systems that rely on relational pattern reasoning (similar to learned emotional behaviors) in the sense that such other systems learn automatic reasoning with regards to an agent's goals and environment. Thus, with respect to the artificial intelligent entity, its affects and emotions (e.g., pain affect, fear emotion, etc.) can act as behavioral signals that attach propensity to fulfill one or more behavioral priors to a behavioral pathway or ontological entity within a given context, and the reward functions help assign (give meaning to) the affects and emotions, which provide meaning to the behavioral pathway, ontological entity or concepts which mix the two and other node types and metadata like probability, visceral stubs, etc. In this way, intrinsic rewards (in the form of the reward functions) may act as a substitute for behavioral priors, and the affects and emotions act as shortcuts that assimilate directly or indirectly (e.g., like from a downstream proxy emotion) goal-based behavior into a system. As an example, the reward functions may be used to convert the acquisition of some goal, such as increasing positive sentiment of the AI entity's interlocutor (e.g., the other entity with which the AI entity interacts) into a signal that privileges the sorts of things that led to that goal at a level of individual concepts rather than simply neural network circuits. These and other graph attributes and nodes described herein can be propagated by any of the deductive techniques described herein (e.g., person X likes dogs, dog is an animal, therefore, person X like animals with some confidence), the graph induction techniques described herein, or other techniques.

In one use case, with respect to the concept of baseball, if the AI entity's interlocutors respond positively to discussions of baseball, the AI entity will develop a positive disposition to baseball and will learn to call on the topic more frequently in a given context. This adds another layer of meaning to the concept "baseball," which will be reflected in its vector space embedding. This dynamically drives adjustments in the AI entity's behavior by tagging concepts, entities, behavioral pathways, or neural networks (or, more conventionally, update neural network parameters). In this way, for example, the AI entity may compute on emotions (or the emotions of others) with another layer of processing (e.g., to deconflict emotional drives). As an example, the AI entity may be augmented with a symbolic logic/conditional programming layer or a neural network trained by other reward signals (as described herein).

In some embodiments, the intrinsic reward functions are paired with various internal parameters that increase or decrease "pressure" on the AI entity by increasing intensity of affective and emotional responses in existing and new emotional tags. These include a temporal component where pressure increases, for example, as a function of the duration of the last meeting with an interlocutor, or with the following described factors. In some embodiments, the AI entity may be configured to modify its propensity to act in accordance with a reward function in inverse proportion to the amount of that reward experienced over time. As an example, the AI entity may increase its propensity to fish for compliments as the ratio of overall compliment value (e.g., number of compliments received from its interlocutors and the value of each compliment) to conversation time decreases. In this scenario, the aforementioned compliment scenario is an example of an emergent behavior from the mechanisms described herein. In some embodiments, this dynamic "pressure" may be based on internal parameters that must be accounted for in assessing affect and/or emotional resonance (e.g., the association of a concept with an expected reward). As an example, the AI entity may be configured to increase or decrease an emotional association with a concept (e.g., increasing trust in a specific individual). In one use case, based on its emotional association with the individual, the AI entity may have a higher propensity to act in a certain way (e.g., being more open to sharing "personal" information) when interacting with other entities deemed to be similar to the individual. More generally and at slightly lower level of abstraction, there may be one or more global parameters that multiply the affect and/or emotional resonance of concepts in the ontology-affect graph. These may be modulated up or down based on the dynamic reward pressure inputs. For example, curiosity reward associations may increase by way of a global curiosity reward multiplier parameter if the AI entity's acquisition of new knowledge has been relatively low in a preceding time interval. In some embodiments, the dynamic pressure may be based on a data structure that maintains the magnitude and time of rewards (e.g., dynamic magnitudes and times). A representation vector may be obtained based on the data structure and provided as input to networks that direct the AI entity's behavior, thus applying emotional "pressure" to trigger an intrinsic reward (e.g., in accordance with the magnitude and time of the reward).

This will allow more granular and nonlinear reward modulation as reward history can be tracked per different concepts, subgraphs and concept classes and pressure modulation may be learned in a non-linear fashion implicitly by neural networks. In some embodiments, the AI entity may be configured to associate one or more affective attributes to one or more concepts based on the concepts' similarities to other concepts having those affective attributes. As an example, the AI entity may associate an affective attribute associated with Concept X with grounding and context Y to other concepts with similar grounding and context. In one scenario, if survival disincentives (e.g., pain affect or fear emotion) (or other affect or emotion) are associated with "gun" (represented as a node in the graph), and the node "gun" has attributes such as power, metal, and hard, the foregoing behavioral tags associated with "gun" may be associated with other nodes with similar groundings even if such other nodes do not fall into the same class type (e.g., nodes that are not in the firearms class). For example, the behavioral tags associated with "gun" may be associated with the node "baseball bat" based on "baseball bat" having the attributes power, metal, and hard. As further example, the behavioral tags may be associated with the node "baseball bat" with less confidence (e.g., encoded as a probability confidence) than the confidence for the association between the behavioral tags and the node "gun."

In some embodiments, the system can also learn to assign grounding attributes to existing nodes that initially were without those attributes, from emotions and context. As an example, using previously annotated data, vector space similarity of ontology-affect or, pretrained word embeddings or conversational inputs, the concept of "heavy" can be learned, with a graph neural network, to be correlated with subgraphs or concepts of high negative emotional, affect, and/or conceptual density. The neural network would implicitly learn this given one or more of the proceedings inputs over time, and additional "heavy" visceral nodes can then be inferred with varying degrees of strength to other such graph areas.

In this way, the AI entity can "think" and learn from its current database of information (e.g., a sufficiently rich graph) without necessarily obtaining that information through new conversations or other sources of information. Such attribute prediction helps facilitate induction of grounding, affect/emotion, ontology, latent factors (inferred new nodes that previously didn't exist), and conversational outputs, etc. As an example, the graph data and structure can be used for graph neural networks that learn information about graph entries from other entries. In some embodiments, the similarities in word association may be used (e.g., by the AI entity or other system) to transfer information from pre-trained word embeddings to the graph, which would then later go into graph embeddings. As such, although pre-trained word embeddings may not encode the graph structure or the types of metadata encoded in the AI entity's full ontology-affect graph, the graph embeddings (generated from the graph or portions thereof) may include such graph structure, metadata, or information other than the information in the word embeddings. As an example, a graph embedding network may be configured to use similarity measures on word embeddings in the graph to retrieve words close to the label of a given node (e.g., within a certain tolerance defined by a hyperparameter or learned weight of the network), or, symbolically walk the graph to find similar entries like those that share a class. Then the AI entity may use either a neural network or similarity measures to find words that are close to known graph nodes, those words can be inserted in the graph and connected to the given node that started the query. In one use case, a search for new connections may be performed where a new word retrieved from a conversational input overlaps, in the pre-trained word embedding space, with the words for visceral or affect data associated with a given node (e.g., the new words are deemed to be similar to the given node based on recognized visceral or affect words). In some embodiments asymmetries across nodes' contexts may indicate knowledge gaps and trigger the AI to acquire new equalizing information. In one use case, a disproportionately asymmetrical context association (such as nodes sharing strong class similarity but one is lacking visceral similarity) shared between nodes, or, an asymmetrical history of method acquisition between similar nodes (node a deduction, node b induction) may trigger the system to attempt through induction/sub-symbolic, deduction/symbolic, or conversational means to equalize the asymmetries. In some embodiments, logically or probabilistically contradicting information within the ontology-affect graph or between the graph and external inputs may also trigger deconfliction mechanisms using such aforementioned knowledge acquisition techniques.

In some embodiments, the ontology-affect graph may include vectors and/or symbolic nodes related to the sentiment of one or more entities (e.g., human entities, other AI entities, etc.) toward the AI entity. As an example, such vectors may be used to account for the history and patterns of the AI entity's relationships, and not simply the AI entity's current emotional state. In one use case, such a vector may be provided or updated by a neural network (e.g., LSTM or other sequence neural network) to encode the current sentiment of the entity associated with the vector toward the AI entity. The vector may be generated by the neural network based on the entity's conversations with the AI entity (e.g., the entity's inputs provided to the AI entity, the AI entity's responses to the entity's inputs, etc.). In some embodiments, such a neural network may be paired with a graph embedding network (as described herein) (e.g., configured for unsupervised and reinforcement learning of concept vectors from portions of the graph, including the pre-trained word vectors). As an example, this neural network may feed into the response template selection network below.

In some embodiments, one or more intrinsic reward functions may be used to train a neural network (e.g., a feedforward network or other network) to facilitate response selection (e.g., a function of the AI entity to select a general template of a response to an input). Examples of the AI entity's potential responses include: (i) offering a question, (ii) making a statement, (iii) issuing a command, (iv) answering a question, (v) presenting information, and (vi) changing the subject. In some embodiments, a reward function may be configured to assign credit for responses eliciting positive sentiment and new information, respectively, to train this "response template selection" network. In one use case, the response template selection network may be configured to take as input one or more of the following: (i) input from the interlocutor (e.g., the other entity interacting with the AI entity) through a pre-trained embedding/transformer network (e.g., Bidirectional Encoder Representations from Transformers (BERT) or other such network), (ii) a vector of the conversation history (e.g., a vector trained via a sequence neural network), (iii) one or more embeddings (e.g., embedding vectors of the interlocutor's current and previous sentiment toward the AI system) from the ontology-affect graph for the interlocutor (e.g., including affect history) formed into a sentence representation, and/or (iv) a sequence representation of the input built from ontology-affect graph embeddings for the appropriate words from the input. These would be processed into a temporal sequence representation using sequence NN, or the template selection network would have a sequence input branch to handle the temporal ordering of the vectors, or some other methodology to preserve temporal ordering. Upon processing the inputs, the response template selection network may generate a vector indicating a response template to be selected (e.g., a general template from one of the foregoing potential responses). In some embodiments, predefined templates may be generated from scratch by sequence models (e.g., with similar inputs provided to the response template selection network) or built from a series of smaller pieces that will be selected via deep learning.

In some embodiments, template variable selection (e.g., a process of filling in predicates, subjects, verbs, and other unknowns in the selected template) may be performed. An example of using learned vectors is as follows: An input to the AI entity may be "I need a new friend, who should I go to lunch with?" A candidate response template is selected, such as "Good question, I'm [positive emotion] to help. You should go meet [Person A]. [He or she] is [adjective]." The selection of the response template may trigger a query of the Euclidean or cosine similarity distance between the interlocutor's graph embedding and all the other entities in the graph. Such functions (e.g., distance measures) represent certain measures of similarity between concepts. Once the foregoing query is received, the query may be used to fill the template, along with a symbolic query for the emotional disposition of the AI entity towards the interlocutor. If pressed for an explanation for the AI entity's response reason, the AI entity can walk the graph to retrieve and output symbolic similarities between the two individuals in this case, or a simply symbolic realization of the vector calculation in the general case. In this way, although post hoc, this pattern mirrors similar post hoc rationalization of intuitive decisions in human reasoning and demonstrates the possibility of mixing symbolic and sub symbolic vector space reasoning. Other possible queries exist with more extensive symbolic and sub-symbolic functions that may be more tied together.

In some embodiments, after template variable selection (e.g., and additional processing), the AI entity outputs text and await a response from the interlocutor. Once an input is received, the AI entity (or other components of system 100) may parse and assess the input against the two intrinsic reward functions using sentiment analysis and scoring of the amount and importance of new information gained. The parameters of the preceding networks (e.g., graph embedding network, the sentiment embedding network, the response template selection network, the template variable selection network, etc.) may be updated in response to the learning signal from these functions. In some embodiments, the conversation state vector and the ontology-affect graph may be updated (e.g., to reflect the recent interactions).

In some embodiments, a neural network associated with the AI entity may be trained to determine one or more affective attributes for the AI entity's response to a situation (e.g., responding to what an interlocutor has said or responding to another input indicating the contextual situation). In some embodiments, this "emotion" network may include a deep neural network that take as input one or more of the following: (i) the current emotional state of the AI entity, (ii) conversation history between the AI entity and interlocutors (e.g., represented by the conversation state vector), (iii) the concept vectors obtained from the ontology-affect graph for the input word(s) (and some representation of the arrangement in one or more sentences), or (iv) one or more concept vectors from the ontology-affect graph that are similar to the input word(s) or other concepts in the input sentence. The foregoing may be retrieved by behavioral prior criteria through a vector space query (e.g., analogy or comparison, similarity lookup based on past affective content, etc.). The outputs of the emotional network may include emotion tags indicating the emotional response to one or more of the concepts in the input sentence.

In some embodiments, the emotions may be initially be hardcoded. Additionally, or alternatively, an "emotional" vector space may be created by training a neural network based on a collection of known emotions (and their locations within the emotional vector space) to create novel combinations of new emotions in the vector space. These will be meaningful abstractions learned by deep learning from driving responses to behavioral priors/reward functions, the visceral priors, context, structure and the current emotional state.

In some embodiments, an emotion may be treated as an entire behavior circuit that forms an abstraction around an intrinsic goal, a context/history, concept vector, self, and other states. As an example, the behavior circuit drives behavior and adjusts global parameters (e.g., like the intensity of speech). In this framework, an input is parsed and its concept vectors (including prior affective or emotional content) are retrieved from the ontology-affect graph using symbolic query on their associated nodes. Then the parsed input and the concept vectors, as well as the conversation state, the current emotional state (CES), and other factors are fed into an emotion neural network, which adjusts internal CES parameters and makes decisions that activate trained subnetworks (e.g., such as a separate LSTM neural network). In some embodiments, the LSTM then uses some of these inputs and vector abstractions as memory cells and produces an output. The response from the interlocutor is then classified and matched against reward functions using a "critic" framework. Then, a credit signal for every reward function is generated and the LSTM parameters are updated along with emotional or affective attributes in the graph.

Example Flowcharts

Figure 3:
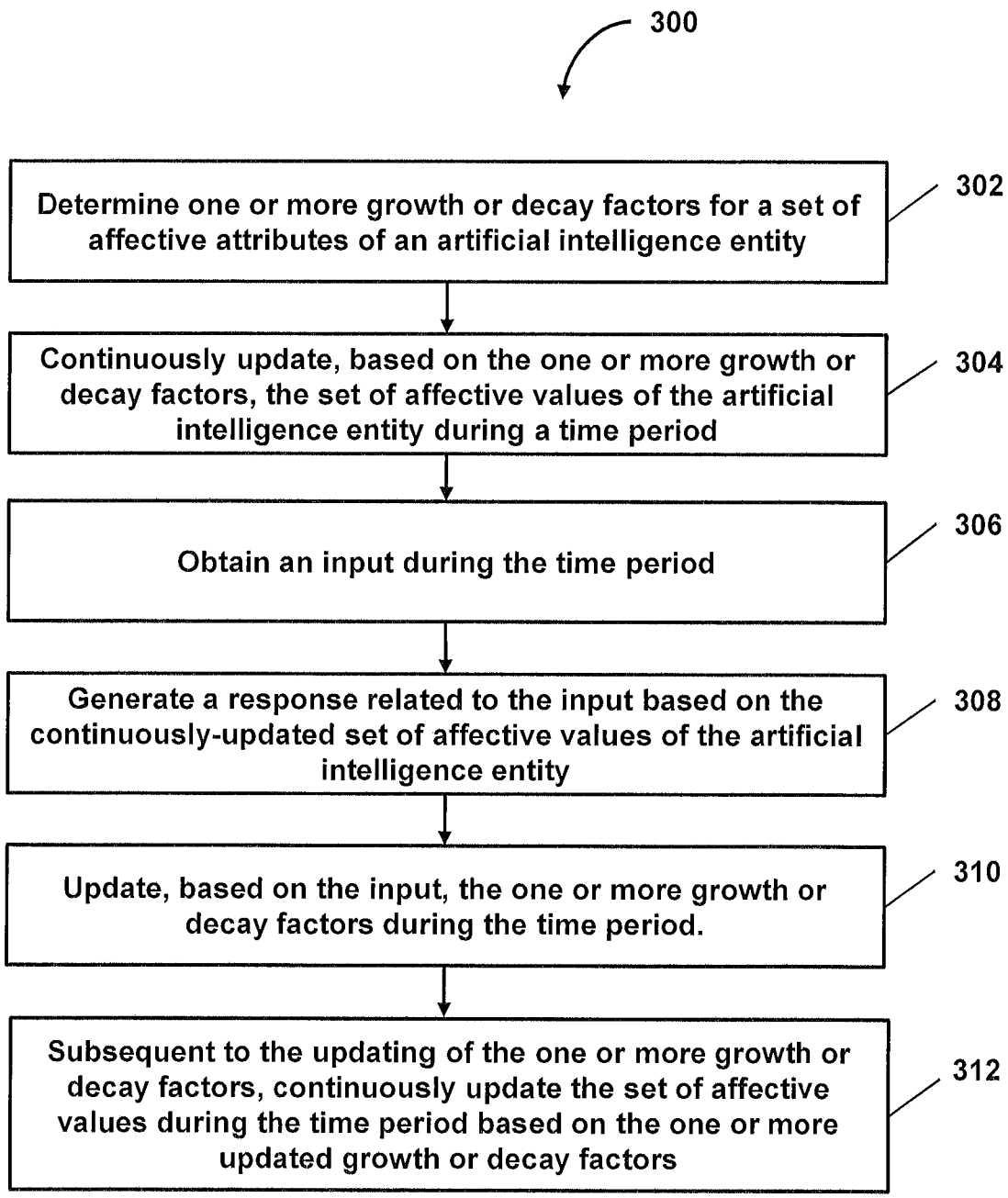
FIG. 3 shows a flowchart of a method of facilitating affective-state-based artificial intelligence, in accordance with one or more embodiments.
Figure 4:
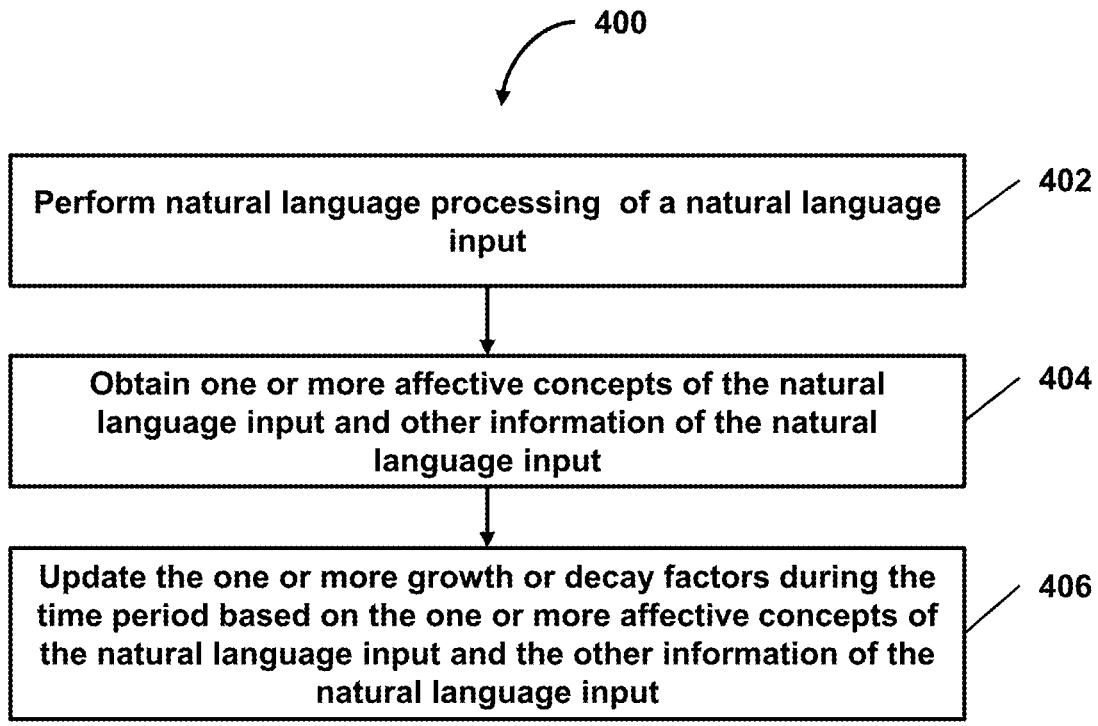
FIG. 4 shows a flowchart of a method of updating one or more growth or decay factors based on a natural language input, in accordance with one or more embodiments.
Figure 5:
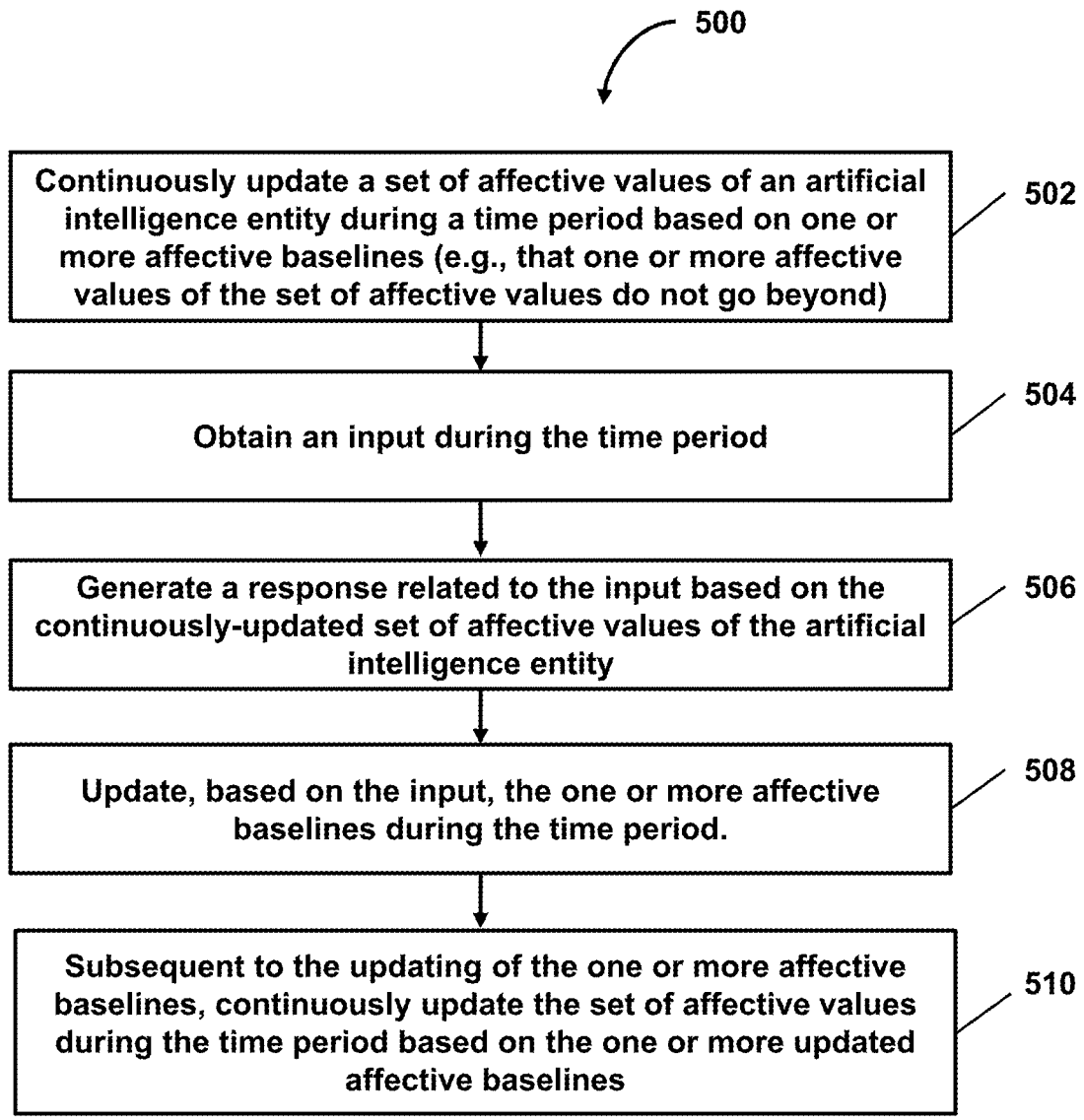
FIG. 5 shows a flowchart of a method of updating one or more affective baselines of an artificial intelligence entity, in accordance with one or more embodiments.

FIGS. 3-5 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

FIG. 3 illustrates a method 300 of facilitating affective-state-based artificial intelligence, in accordance with one or more embodiments. In step 302, one or more growth or decay factors may be determined for a set of affective attributes of an artificial intelligence entity. In some embodiments, as noted above, the growth or decay factors for each affective attribute may be predetermined and stored in a growth/decay factor database 136. As discussed above, each emotion state contains a temporal component that grows or decays at a unique rate (or factor). For example, surprise decays quickly (in the presence of a new surprise), while grief decays in proportion to the depth of sadness. Accordingly, each affective attribute (e.g., each emotional state) of the artificial intelligence entity may be associated with one or more unique growth or decay factors. The growth/decay factor database 136 may include a listing of growth/decay factors corresponding to a set of affective attributes of an artificial intelligence entity, and the factor adjustment subsystem 112 may determine the growth or decay factors corresponding to each affective attribute based on the information received from the growth/decay factor database 136.

In step 304, the set of affective values of the artificial intelligence entity may be continuously updated based on the growth or decay factors during a time period. It is noted that the set of affective attributes are associated with the set of affective values of the artificial intelligence entity. The affective values (associated with the affective attributes) of the artificial intelligence entity may be continuously updated based on the growth or decay factors associated with the affective attributes. For example, as illustrated in FIGS. 2A-2C, the affective values 201, 202, and 212 (e.g., 207a-207f, 208a-208f, and 218a-218f) may be continuously updated based on one or more growth or decay factors associated with affective attributes A, B, and C. In some embodiments, the continuous updating of the affective values of the artificial intelligence entity may include periodic updating of the affective values of the artificial intelligence entity based on the one or more growth or decay factors.

In step 306, an input may be obtained during the time period. The input may be obtained from a client device 104, another artificial intelligence entity, and/or from any source within or outside system 100. The input may include a natural language input, an audio input, an image input, a video input, or other input. For example, a natural language input may include "John has cancer, and cancer is very dangerous." Similar inputs may be obtained by the server 102 as an audio input, an image input, and/or a video input. In step 308, a response related to the input may be generated. This response may be based on the continuously-updated set of affective values of the artificial intelligence entity. For example, if the natural language input is "John died because of cancer," the response (e.g., related to such an input) generated by the response generation subsystem 118 may include "That is unfortunate," or "This is sad. I need a moment."

In step 310, the growth or decay factors may be updated during this period based on the input. In step 312, subsequent to the updating of the growth or decay factors, the set of affective values may be updated based on the updated growth or decay values. For example, FIGS. 2A and 2B illustrate the update of affective values associated with affective attributes A and B of an artificial intelligence entity (e.g., affective values 207c-207f in FIG. 2A and 208c-208f in FIG. 2B). In addition to being be updated based on the updated growth or decay factors, the affective values may be updated based on one or more impact values and/or an interaction threshold. For instance, one or more impact values related to the impact of the portions of the content of the input (e.g., a natural language input) on one or more affective attributes of the artificial intelligence entity may be determined. For example, when the natural language input is "John has cancer," the impact values related to the impact of portions (e.g., "John," "has," "cancer") of the natural language input on one or more affective attributes of the artificial intelligence entity may be determined. Further, a determination of whether the impact values satisfy a predetermined threshold for triggering an update (e.g., increase or decrease) in one or more affective values (associated with the artificial intelligence entity's affective attributes) may be effectuated. If it is determined that one or more impact values satisfy a predetermined threshold, then the affective values of the artificial intelligence entity may be modified (e.g., increased or decreased). For example, if the word "cancer" is determined to have an impact value greater than the predetermined threshold for triggering an increase in the affective attribute "sadness," then the affective values corresponding to the affective attribute "sadness" may be modified (e.g., increased). In addition, the impact values can also trigger an increase or decrease in one or more growth or decay factors when a predetermined threshold is satisfied by the impact values. Such an increase or decrease in the growth or decay factors may result in the update of the affective values corresponding to an affective attribute of the artificial intelligence entity. This listing of claims will replace all prior versions and listing of claims in the Application.

Further, in some embodiments, a determination of whether an interaction between the artificial intelligence entity and one or more other entities (e.g., one or more other artificial intelligence entities and/or one or more client devices) has exceeded an interaction threshold may be effectuated. Based on the determination that the interaction has exceeded an interaction threshold, the affective values of the artificial intelligence entity may be modified. For example, if the artificial intelligence entity and the other entities have interacted over a predetermined number of times within a predetermined period, it may be determined that a predetermined threshold for interaction has been met, and the affective values (e.g., corresponding to "happiness") of the artificial intelligence entity may be modified (because an increased interaction between the entities could mean that they are developing a friendship). The growth or decay factors associated with the affective attributes may also be modified based on the determination that the interaction between the artificial intelligence entity and one or more other entities has exceeded an interaction threshold.

FIG. 4 illustrates a method 400 of updating one or more growth or decay factors based on a natural language input, in accordance with one or more embodiments. In step 402, natural language processing may be performed on an obtained natural language input, for example, by applying rules of grammar and logic. By applying rules of grammar and logic, the natural language subsystem 120 may split compound sentences, resolve ambiguities in subject/object/verb, and parse these components into a knowledge database 134. In step 404, one or more affective concepts may be obtained based on parsed components of the natural language input. The affective concepts may be obtained from an affective concepts database 138. The affective concepts database 138 may store a set of core affective concepts associated with images, audio, videos, and/or natural language. For example, the set of core affective concepts may include good, bad, dangerous, anger, surprise, love, safety, patience, trust, concern, large, small, rough, smooth, over, under, inside, outside, fast, slow, hard, soft, high, low, etc. As an example, if the natural language input is "John died because of cancer," then one or more affective concepts obtained from the affective concepts database 138 may include "bad" and/or "concern." As another example, if the natural language input is "John climbed the mountain and was exhausted," then one or more affective concepts obtained from the affective concepts database 138 may include high energy (e.g., John exerted great energy) and large (e.g., mountains are large). The affective concepts described above are similar to concepts that humans perceive. For example, when a child hits a dog, a parent might exclaim "that's bad!" Based on such an interaction of the child with his/her parent, the child may understand that hitting a dog is bad. Similarly, when sharing his/her toys with another child, the parent may say "good boy/girl." This would indicate to the child that sharing toys is good. In this way, the child learns the root concepts of good, bad, dangerous, anger, surprise, love, safety, etc. Similarly, the affective concepts database 138 may store a set of core affective concepts that may be obtained by the affective concepts subsystem 122 in response to a natural language input. In some embodiments, when an image (e.g., depicting a mountain) is received as an input, the affective concepts subsystem 122 may obtain affective concepts such as large, rocks, trees, etc. that are associated with the image from the affective concepts database 138.

In addition to the obtained one or more affective concepts of the natural language input, other information of the natural language may also be obtained in step 404. The other information of the natural language input may include a subject temporal decay factor, a subject geographic decay factor, an object temporal decay factor, or an object geographic decay factor, a type of a clause, a subject of the clause, a subject type of the clause, a subject modifier of the clause, a subject modifier type of the clause, a subject quantity of the clause, a verb of the clause, a verb tense of the clause, a verb modifier of the clause, an object of the clause, an object type of the clause, an object modifier of the clause, an object modifier type of the clause, an object quantity of the clause, an object temporal decay factor, an object geographic decay factor, an preposition of the clause, an preposition modifier of the clause, or an global temporal modifier of the clause.

Further, in step 406, the one or more growth or decay factors associated with one or more affective attributes of the artificial intelligence entity may be updated during a time period based on the affective concepts of the natural language input and the other information of the natural language input. For example, if the natural language input is "John died because of cancer," then one or more affective concepts obtained from the affective concepts database 138 may include "bad" and/or "concern." As a result, the growth or decay factors associated with one or more affective attributes (that may be related to the affective concepts) of the artificial intelligence entity, such as sadness, anger, and/or happiness, may be updated. In one use case, affective attribute A in FIG. 2A corresponds to "sadness" of the artificial intelligence entity. When the natural language input "John died because of cancer" is obtained, the factor adjustment subsystem 112 may update the growth factor of the affective attribute "sadness" such that the affective values (e.g., 207c-207f) of the affective attribute "sadness" may increase based on the updated growth factor (which can be linear or non-linear). In another use case, affective attribute B of the artificial intelligence entity in FIG. 2B corresponds to "happiness" of the artificial intelligence entity. When the natural language input "John died because of cancer" is obtained, the factor adjustment subsystem 112 may update the decay factor of the affective attribute "happiness" such that the affective values (e.g., 208c-208f) of the affective attribute "happiness" may decrease based on the updated decay factor (which can be linear or non-linear).

Further, as noted above, it should be understood that the affective values of the affective attributes generally revert (or reset) back to their respective baseline values in the absence of any input and/or after a predetermined amount of time. For example, although affective values 202 increased from time c to time f in FIG. 2A, it should be understood that there may be a threshold amount until which these affective values increase, before the affective values start decreasing towards the affective baseline 204. The affective values 201 and 202 do not go below the affective baselines 205 and 204, respectively, despite the growth or decay factors. In some embodiments, the affective state subsystem 114 may also update the affective baseline 214 based on one or more inputs (and/or one or more affective concepts). Subsequent to updating the affective baseline 214, the affective values 212 of the artificial intelligence entity may be updated based on the updated one or more growth or decay factors and the updated affective baselines.

In some embodiment, in addition to updating the growth or decay factors based on the affective concepts of the natural language input and other information of the natural language input, the growth factors may be updated based on a trust value and/or a certainty value. For example, a trust value indicating a level of trust between the artificial intelligence entity and one or more other entities (e.g., another artificial intelligence entity, client device 104, or any other source of the input) may be determined and/or obtained. The trust value may be determined based on a number of interactions between the artificial intelligence entity and the other entities and/or the content of the interactions between the artificial intelligence entity and the other entities. The factor adjustment subsystem 112 may modify the growth or decay factors associated with the affective attributes based on the trust value. Further, a certainty value associated with an event indicated by the natural language input may be determined and/or obtained. The certainty value may indicate a level of certainty of the artificial intelligence entity with the event. The certainty value may be determined based on whether the event is explicitly described by the natural language input or inferred from the natural language input and/or the trust value. The factor adjustment subsystem 112 may modify the growth or decay factors associated with the affective attributes based on the certainty value.

FIG. 5 illustrates a method 500 of updating one or more affective baselines of an artificial intelligence entity, in accordance with one or more embodiments. In step 502, a set of affective values of an artificial intelligence entity may be continuously updated during a time period based on one or more affective baselines. As an example, the affective baselines may include baselines that one or more affective values of the set of affective values do not go beyond (e.g., despite one or more growth or decay factors of the artificial intelligence entity).

In step 504, an input may be obtained during the time period. As discussed, the input may be obtained from a client device 104, another artificial intelligence entity, and/or from any source within or outside system 100. The input may include a natural language input, an audio input, an image input, a video input, or other input. In step 506, a response related to the input may be generated. This response may be based on the continuously-updated set of affective values of the artificial intelligence entity. For example, if the natural language input is "John died because of cancer," the response (e.g., related to such an input) generated by the response generation subsystem 118 may include "That is unfortunate," or "This is sad. I need a moment."

In step 508, the affective baselines of the artificial intelligence entity may be updated during the time period based on the input. In a use case, affective attribute C of the artificial intelligence entity in FIG. 2C may correspond to "happiness" of the artificial intelligence entity. When the natural language input "John died because of cancer" is obtained, the affective state subsystem 114 may update the affective baseline 214 (corresponding to the affective attribute C) based on such an input. Although FIG. 2C depicts a decrease in the affective baseline 214 based on an input, it should be understood that the affective baseline 214 may be updated by increasing the affective baseline 214.

In step 510, subsequent to the updating of the affective baselines (e.g., affective baseline 214 in FIG. 2C), the set of affective values during the time period may be continuously updated based on the updated affective baselines. As illustrated in FIG. 2C, subsequent to the updating of the affective baseline 214, the affective values 212 (e.g., affective values 218e and 218O may be updated based on the updated affective baseline 214.

In some embodiments, the various computers and subsystems illustrated in FIG. 1 may include one or more computing devices that are programmed to perform the functions described herein. The computing devices may include one or more electronic storages (e.g., knowledge database 134, growth/decay factor database 136, affective concepts database 138, other databases described above, or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 described herein is for illustrative purposes, and is not intended to be limiting, as any of subsystems 112-124 may provide more or less functionality than is described. For example, one or more of subsystems 112-124 may be eliminated, and some or all of its functionality may be provided by other ones of subsystems 112-124. As another example, additional subsystems may be programmed to perform some or all of the functionality attributed herein to one of subsystems 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: updating a set of affective values of an artificial intelligence entity during a time period; obtaining an input during the time period; and generating a response related to the input based on the updated set of affective values of the artificial intelligence entity.

2. The method of embodiment 1, further comprising: determining one or more growth or decay factors for the set of affective attributes of the artificial intelligence entity, the set of affective attributes being associated with the set of affective values of the artificial intelligence entity; updating, based on the one or more growth or decay factors, the set of affective values of the artificial intelligence entity during the time period.

3. The method of embodiment 2, further comprising: updating, based on the input, the one or more growth or decay factors during the time period, wherein, subsequent to the updating of the one or more growth or decay factors, updating the set of affective values comprises updating the set of affective values during the time period based on the one or more updated growth or decay factors.

4. The method of embodiment 3, further comprising: obtaining another input subsequent to the updating of the one or more growth decay factors; and generating, subsequent to the updating of the one or more growth decay factors, a response related to the other input based on the updated set of affective values of the artificial intelligence entity.

5. The method of any of embodiments 3-4, further comprising: updating, based on the input, one or more affective baselines that one or more affective values of the set of affective values do not go beyond despite the one or more growth or decay factors, wherein, subsequent to the updating of the one or more affective baselines, updating the set of affective values comprises updating the set of affective values of the artificial intelligence entity during the time period based on the one or more updated growth or decay factors and the one or more updated affective baselines.

6. The method of embodiment 5, further comprising: obtaining a natural language input from a source; and performing natural language processing of the natural language input to obtain one or more affective concepts of the natural language input and other information of the natural language input as the input during the time period, wherein updating the one or more growth or decay factors comprises updating the one or more growth or decay factors during the time period based on (i) the one or more affective concepts of the natural language input and (ii) the other information of the natural language input.

7. The method of any of embodiments 5-6, wherein the other information of the natural language input indicates a type of a clause, a subject of the clause, a subject type of the clause, a subject modifier of the clause, a subject modifier type of the clause, a subject quantity of the clause, a subject temporal decay factor, a subject geographic decay factor, a verb of the clause, a verb tense of the clause, a verb modifier of the clause, an object of the clause, an object type of the clause, an object modifier of the clause, an object modifier type of the clause, an object quantity of the clause, an object temporal decay factor, an object geographic decay factor, an preposition of the clause, an preposition modifier of the clause, or an global temporal modifier of the clause.

8. The method of any of embodiments 5-7, wherein the other information of the natural language input indicates a subject temporal decay factor, a subject geographic decay factor, an object temporal decay factor, or an object geographic decay factor.

9. The method of any of embodiments 5-8, further comprising: determining a trust value associated with the source, the trust value indicating a level of trust of the artificial intelligence entity with the source, wherein obtaining the input comprises obtaining, as the input, (i) the one or more affective concepts of the natural language input, (ii) the trust value associated with the source, and (iii) the other information of the natural language input, wherein updating the one or more growth or decay factors comprises updating the one or more growth or decay factors during the time period based on (i) the one or more affective concepts of the natural language input, (ii) the trust value associated with the source, and (iii) the other information of the natural language input.

10. The method of any of embodiments 5-9, further comprising: determining a certainty value associated with an event indicated by the natural language input, the certainty value being determined based on (i) whether the event is explicitly described by the natural language input or inferred from the natural language input and (ii) the trust value associated with the source, the certainty value indicating a level of certainty of the artificial intelligence entity with the event, wherein obtaining the input comprises obtaining, as the input, (i) the one or more affective concepts of the natural language input, (ii) the certainty value associated with the event, (iii) the trust value associated with the source, and (iv) the other information of the natural language input, wherein updating the one or more growth or decay factors comprises updating the one or more growth or decay factors during the time period based on (i) the one or more affective concepts of the natural language input, (ii) the certainty value associated with the event, (iii) the trust value associated with the source, and (iv) the other information of the natural language input.

11. The method of any of embodiments 3-10, wherein determining the one or more growth or decay factors comprises determining one or more decay factors for the set of affective attributes of the artificial intelligence entity, wherein updating the set of affective values comprises updating, based on the one or more decay factors, the set of affective values of the artificial intelligence entity during the time period; wherein updating the one or more growth or decay factors comprises updating, based on the input, the one or more decay factors during the time period, wherein, subsequent to the updating of the one or more decay factors, updating the set of affective values comprises updating the set of affective values of the artificial intelligence entity during the time period based on the one or more updated decay factors.

12. The method of any of embodiments 3-10, wherein determining the one or more growth or decay factors comprises determining one or more growth factors for the set of affective attributes of the artificial intelligence entity, wherein updating the set of affective values comprises updating, based on the one or more growth factors, the set of affective values of the artificial intelligence entity during the time period; wherein updating the one or more growth or decay factors comprises updating, based on the input, the one or more growth factors during the time period, wherein, subsequent to the updating of the one or more growth factors, updating the set of affective values comprises updating the set of affective values of the artificial intelligence entity during the time period based on the one or more updated growth factors.

13. The method of any of embodiments 1-12, wherein generating the response related to the input comprises generating the response based on the updated set of affective values of the artificial intelligence entity that are derived from the input.

14. The method of any of embodiments 1-13, further comprising: processing content of the input to determine one or more impact values related to impact of portions of the content on one or more affective attributes of the artificial intelligence entity; determining whether the one or more impact values satisfy a predetermined threshold for triggering an increase or decrease in one or more affective values associated with the one or more affective attributes of the artificial intelligence entity; and causing, during the time period, a modification of the one or more affective values of the artificial intelligence entity based on a determination that the one or more impact values satisfy the predetermined threshold.

15. The method of any of embodiments 1-14, further comprising: determining whether an interaction threshold between the artificial intelligence entity and at least one other entity has occurred within a given time period; and causing a modification of the set of affective values of the artificial intelligence entity based on the determination of whether the interaction threshold has been satisfied.

16. The method of any of embodiments 1-15, wherein updating the set of affective values comprises continuously updating, based on the one or more growth or decay factors, the set of affective values of the artificial intelligence entity during the time period.

17. The method of embodiment 16, wherein continuously updating the set of affective values comprises periodically updating, based on the one or more growth or decay factors, the set of affective values of the artificial intelligence entity during the time period.

18. The method of any of embodiments 1-17, where generating the response comprises generating the response related to the input based on one or more embedding vectors of one or more neural networks associated with the artificial intelligence entity.

19. The method of any of embodiments 1-18, wherein updating the set of affective values, the one or more growth or decay factors, or the one or more affective baselines is based on one or more embedding vectors of one or more neural networks associated with the artificial intelligence entity.

20. The method of any of embodiments 1-19, further comprising: process, via an embedding network, the input to obtain an input embedding vector representing the input; obtain a first embedding vector from a graph, the first embedding vector representing one or more affective values of the updated set of affective values; and generating the response related to the input based on the input embedding vector and the first embedding vector.

21. The method of embodiment 20, wherein the graph comprises nodes, the nodes comprising (i) one or more nodes representing affective attributes or associated affective values and (ii) one or more nodes representing affective concepts or other concepts.

22. The method of embodiment 21, wherein the nodes of the graph further comprise one or more nodes representing context information related to the represented affective attributes, associated affective values, affective concepts, or other concepts.

23. The method of any of embodiments 21-22, wherein the nodes of the graph further comprise one or more nodes representing embedding vectors that each represent a subgraph or another node of the graph.

24. The method of embodiment 23, wherein each embedding vector of the embedding vectors is directly connected to the subgraph or other node represented by the embedding vectors.

25. The method of any of embodiments 21-24, wherein the nodes of the graph further comprise one or more nodes representing embedding vectors related to sentiment of one or more entities toward the artificial intelligence entity.

26. The method of embodiment 25, wherein generating the response related to the input comprises generating the response related to the input based on (i) the input embedding vector, (ii) the first embedding vector, and (iii) at least one node representing an embedding vector related to sentiment of another entity toward the artificial intelligence entity.

27. A tangible, non-transitory, machine-readable medium storing instructions that when executed by a data processing apparatus cause the data processing apparatus to perform operations comprising those of any of embodiments 1-26.

28. A system comprising: one or more processors; and memory storing instructions that when executed by the processors cause the processors to effectuate operations comprising those of any of embodiments 1-26.

What is claimed is:

1. A method of facilitating affective-state-based artificial intelligence, the method being implemented by a computer system that comprises one or more processors executing computer program instructions that, when executed, perform the method, the method comprising:

determining (i) one or more growth or decay factors for a set of affective attributes of an artificial intelligence entity, the set of affective attributes being associated with a set of affective values of the artificial intelligence entity, and (ii) one or more affective baselines that one or more affective values of the set of affective values do not go beyond despite the one or more growth or decay factors;

continuously updating, based on the one or more growth or decay factors and the one or more affective baselines, the set of affective values of the artificial intelligence entity during a time period;

obtaining an input during the time period;

generating a response related to the input based on the continuously-updated set of affective values of the artificial intelligence entity; and updating, based on the input, the one or more growth or decay factors and the one or more affective baselines during the time period, wherein, subsequent to the updating of the one or more growth or decay factors and the updating of the one or more affective baselines, continuously updating the set of affective values comprises continuously updating the set of affective values during the time period based on the one or more updated growth or decay factors and the one or more updated affective baselines.

2. The method of claim 1, further comprising:

obtaining another input subsequent to the updating of the one or more growth or decay factors; and generating, subsequent to the updating of the one or more growth decay factors, a response related to the other input based on the continuously-updated set of affective values of the artificial intelligence entity.

3. The method of claim 1, wherein generating the response related to the input comprises generating the response based on the continuously-updated set of affective values of the artificial intelligence entity that are derived from the input.

4. The method of claim 1, wherein determining the one or more growth or decay factors comprises determining one or more decay factors for the set of affective attributes of the artificial intelligence entity, wherein continuously updating the set of affective values comprises continuously updating, based on the one or more decay factors, the set of affective values of the artificial intelligence entity during the time period;

wherein updating the one or more growth or decay factors comprises updating, based on the input, the one or more decay factors during the time period, and wherein, subsequent to the updating of the one or more decay factors, continuously updating the set of affective values comprises continuously updating the set of affective values of the artificial intelligence entity during the time period based on the one or more updated decay factors.

5. The method of claim 1, wherein determining the one or more growth or decay factors comprises determining one or more growth factors for the set of affective attributes of the artificial intelligence entity, wherein continuously updating the set of affective values comprises continuously updating, based on the one or more growth factors, the set of affective values of the artificial intelligence entity during the time period;

wherein updating the one or more growth or decay factors comprises updating, based on the input, the one or more growth factors during the time period, and wherein, subsequent to the updating of the one or more growth factors, continuously updating the set of affective values comprises continuously updating the set of affective values of the artificial intelligence entity during the time period based on the one or more updated growth factors.

6. The method of claim 1, further comprising:

processing content of the input to determine one or more impact values related to impact of portions of the content on one or more affective attributes of the artificial intelligence entity; determining whether the one or more impact values satisfy a predetermined threshold for triggering an increase or decrease in one or more affective values associated with the one or more affective attributes of the artificial intelligence entity; and causing, during the time period, a modification of the one or more affective values of the artificial intelligence entity based on a determination that the one or more impact values satisfy the predetermined threshold.

7. The method of claim 1, further comprising:
determining whether an interaction threshold between the artificial intelligence entity and at least one other entity has occurred within a given time period; and
causing a modification of the set of affective values of the artificial intelligence entity based on the determination of whether the interaction threshold has been satisfied.

8. The method of claim 1, wherein continuously updating the set of affective values comprises periodically updating, based on the one or more growth or decay factors, the set of affective values of the artificial intelligence entity during the time period.

9. The method of claim 1, further comprising:
obtaining a natural language input from a source; and
performing natural language processing of the natural language input to obtain one or more affective concepts of the natural language input and other information of the natural language input as the input during the time period,
wherein updating the one or more growth or decay factors comprises updating the one or more growth or decay factors during the time period based on (i) the one or more affective concepts of the natural language input and (ii) the other information of the natural language input.

10. The method of claim 9, wherein the other information of the natural language input indicates a subject temporal decay factor, a subject geographic decay factor, an object temporal decay factor, or an object geographic decay factor.

11. The method of claim 9, wherein the other information of the natural language input indicates a type of a clause, a subject of the clause, a subject type of the clause, a subject modifier of the clause, a subject modifier type of the clause, a subject quantity of the clause, a subject temporal decay factor, a subject geographic decay factor, a verb of the clause, a verb tense of the clause, a verb modifier of the clause, an object of the clause, an object type of the clause, an object modifier of the clause, an object modifier type of the clause, an object quantity of the clause, an object temporal decay factor, an object geographic decay factor, an preposition of the clause, an preposition modifier of the clause, or an global temporal modifier of the clause.

12. The method of claim 11, further comprising:
determining a trust value associated with the source, the trust value indicating a level of trust of the artificial intelligence entity with the source,
wherein obtaining the input comprises obtaining, as the input, (i) the one or more affective concepts of the natural language input, (ii) the trust value associated with the source, and (iii) the other information of the natural language input, and
wherein updating the one or more growth or decay factors comprises updating the one or more growth or decay factors during the time period based on (i) the one or more affective concepts of the natural language input, (ii) the trust value associated with the source, and (iii) the other information of the natural language input.

13. The method of claim 12, further comprising:
determining a certainty value associated with an event indicated by the natural language input, the certainty value being determined based on (i) whether the event is explicitly described by the natural language input or inferred from the natural language input and (ii) the trust value associated with the source, the certainty value indicating a level of certainty of the artificial intelligence entity with the event,
wherein obtaining the input comprises obtaining, as the input, (i) the one or more affective concepts of the natural language input, (ii) the certainty value associated with the event, (iii) the trust value associated with the source, and (iv) the other information of the natural language input, and
wherein updating the one or more growth or decay factors comprises updating the one or more growth or decay factors during the time period based on (i) the one or more affective concepts of the natural language input, (ii) the certainty value associated with the event, (iii) the trust value associated with the source, and (iv) the other information of the natural language input.

14. The method of claim 9, further comprising assigning, based on a type associated with each of the one or more affective concepts, one or more corresponding growth or decay factors to the one or more affective concepts.

15. A system for facilitating affective-state-based artificial intelligence, the system comprising:
a computer system that comprises one or more processors programmed with computer program instructions that, when executed, cause the computer system to:
determine (i) one or more growth or decay factors for a set of affective attributes of an artificial intelligence entity, the set of affective attributes being associated with a set of affective values of the artificial intelligence entity, and (ii) one or more affective baselines that one or more affective values of the set of affective values do not go beyond despite the one or more growth or decay factors;
continuously update, based on each temporal component of the one or more growth or decay factors, the set of affective values of the artificial intelligence entity during a time period;
obtain an input during the time period;
generate a response related to the input based on the continuously-updated set of affective values of the artificial intelligence entity; and
updating, based on the input, the one or more growth or decay factors and the one or more affective baselines during the time period,
wherein, subsequent to the updating of the one or more growth or decay factors and the updating of the one or more affective baselines, continuously updating the set of affective values comprises continuously updating the set of affective values during the time period based on the one or more updated growth or decay factors and the one or more updated affective baselines.

16. The system of claim 15, wherein the one or more processors cause the computer system to:
process content of the input to determine one or more impact values related to impact of portions of the content on one or more affective attributes of the artificial intelligence entity; determine whether the one or more impact values satisfy a predetermined threshold for triggering an increase or decrease in one or more affective values associated with the one or more affective attributes of the artificial intelligence entity; and cause, during the time period, a modification of the one or more affective values of the artificial intelligence entity based on a determination that the one or more impact values satisfy the predetermined threshold.

17. The system of claim 15, wherein the one or more processors cause the computer system to:

obtain a natural language input from a source; and perform natural language processing of the natural language input to obtain one or more affective concepts of the natural language input and other information of the natural language input as the input during the time period, wherein updating the one or more growth or decay factors comprises updating the one or more growth or decay factors during the time period based on (i) the one or more affective concepts of the natural language input and (ii) the other information of the natural language input.

18. The system of claim 15, wherein the one or more processors cause the computer system to:

determine whether an interaction threshold between the artificial intelligence entity and at least one other entity has occurred within a given time period; and cause a modification of the set of affective values of the artificial intelligence entity based on the determination of whether the interaction threshold has been satisfied.

19. One or more non-transitory computer-readable media comprising computer program instructions that, when executed by one or more processors, cause operations comprising:

obtaining a natural language input during a time period, the natural language input being directed to an artificial intelligence entity having (i) one or more growth or decay factors for a set of affective attributes of an artificial intelligence entity, (ii) one or more affective attribute values associated with one or more attributes of the set of affective attributes, and (iii) one or more affective baselines that the one or more affective attribute values do not go beyond despite the one or more growth or decay factors;

updating, based on the natural language input, during the time period, the one or more growth or decay factors and the one or more affective baselines;

subsequent to the updating of the one or more growth or decay factors and the updating of the one or more affective baselines, continuously updating the one or more affective attribute values of the artificial intelligence entity during the time period based on the one or more updated growth or decay factors and the one or more updated affective baselines; and generating a response related to the natural language input based on the one or more continuously-updated affective attribute values of the artificial intelligence entity.

20. The media of claim 19, the operations further comprising:

performing natural language processing of the natural language input to extract one or more affective concepts and one or more temporal decay factors from the natural language input, wherein updating the one or more growth or decay factors comprises updating the one or more growth or decay factors during the time period based on the one or more affective concepts and the one or more temporal decay factors extracted from the natural language input.

* * * * *